United States Patent
Badawy et al.

(10) Patent No.: US 12,056,588 B2
(45) Date of Patent: Aug. 6, 2024

(54) SYSTEM AND METHOD FOR INCREMENTAL TRAINING OF MACHINE LEARNING MODELS IN ARTIFICIAL INTELLIGENCE SYSTEMS, INCLUDING INCREMENTAL TRAINING USING ANALYSIS OF NETWORK IDENTITY GRAPHS

(71) Applicant: SailPoint Technologies, Inc., Wilmington, DE (US)

(72) Inventors: Mohamed M. Badawy, Round Rock, TX (US); Rajat Kabra, Austin, TX (US); Jostine Fei Ho, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

(21) Appl. No.: 18/334,183

(22) Filed: Jun. 13, 2023

(65) Prior Publication Data

US 2023/0325723 A1    Oct. 12, 2023

Related U.S. Application Data

(63) Continuation of application No. 17/669,554, filed on Feb. 11, 2022, now Pat. No. 11,710,078, which is a continuation of application No. 17/180,357, filed on Feb. 19, 2021, now Pat. No. 11,295,241.

(51) Int. Cl.
*G06F 16/00* (2019.01)
*G06F 16/245* (2019.01)
*G06N 20/00* (2019.01)

(52) U.S. Cl.
CPC ........... *G06N 20/00* (2019.01); *G06F 16/245* (2019.01)

(58) Field of Classification Search
CPC .... G06F 3/0659; G06F 3/0623; G06F 3/0608; G06F 3/067; G06F 3/0641; G06F 16/1752; G06F 3/0671; H03M 7/6005; H03M 7/6011; H03M 7/4056
See application file for complete search history.

(56) References Cited

U.S. PATENT DOCUMENTS

| | | |
|---|---|---|
| 9,723,025 B2 | 8/2017 | Kasturirangan |
| 11,695,828 B2 | 7/2023 | Badawy |
| 11,809,581 B2 | 11/2023 | Badawy |
| 11,811,833 B2 | 11/2023 | Badawy |
| 11,818,136 B2 | 11/2023 | Badawy |

(Continued)

FOREIGN PATENT DOCUMENTS

| | | |
|---|---|---|
| JP | 2011-154532 A | 8/2011 |
| JP | 2015-522859 A | 8/2015 |
| JP | 2018-092600 A | 6/2018 |

OTHER PUBLICATIONS

Notice of Allowance for U.S. Appl. No. 17/391,371, mailed Aug. 9, 2023, 5 pgs.

(Continued)

*Primary Examiner* — Yicun Wu
(74) *Attorney, Agent, or Firm* — Sprinkle IP Law Group

(57) ABSTRACT

Systems and methods for embodiments of incremental training of machine learning model in artificial intelligence systems are disclosed. Specifically, embodiments of incremental training of machine learning models using drift detection models are disclosed, including embodiments that utilize drift detection models to determine drift based on identity graphs in artificial intelligence identity management systems.

20 Claims, 10 Drawing Sheets

(56) References Cited

U.S. PATENT DOCUMENTS

| | | |
|---|---|---|
| 11,888,602 B2 | 1/2024 | Badawy |
| 11,902,335 B2 | 2/2024 | Badawy |
| 11,962,597 B2 | 4/2024 | Badawy |
| 11,966,858 B2 | 4/2024 | Badawy |
| 2015/0200966 A1 | 7/2015 | Kasturirangan |
| 2019/0260733 A1 | 8/2019 | Koranda |
| 2024/0073216 A1 | 2/2024 | Badawy |

OTHER PUBLICATIONS

Office Action for Japanese Patent Application No. 2021-530292, with English translation, mailed Jul. 26, 2023, 6 pgs.

Office Action for U.S. Appl. No. 17/891,639, mailed Aug. 23, 2023, 10 pgs.

Notice of Allowance for U.S. Appl. No. 17/985,206, mailed Sep. 7, 2023, 6 pgs.

Notice of Allowance for U.S. Appl. No. 17/961,939, mailed Jun. 7, 2023, 8 pgs.

Notice of Allowance for U.S. Appl. No. 17/501,330, mailed Jun. 27, 2023, 5 pgs.

Notice of Allowance for U.S. Appl. No. 17/543,566, mailed Jul. 19, 2023, 5 pgs.

Notice of Allowance for U.S. Appl. No. 17/891,639, mailed Dec. 14, 2023, 8 pgs.

Notice of Allowance for U.S. Appl. No. 17/825,545, mailed Dec. 18, 2023, 9 pgs.

Notice of Allowance for U.S. Appl. No. 17/391,371, mailed Sep. 20, 2023, 2 pgs.

Notice of Allowance for U.S. Appl. No. 17/543,566, mailed Sep. 20, 2023, 5 pgs.

Notice of Allowance for U.S. Appl. No. 17/961,939, mailed Oct. 18, 2023, 7 pgs.

Notice of Allowance for U.S. Appl. No. 17/891,639, mailed Feb. 29, 2024, 7 pgs.

Notice of Allowance for U.S. Appl. No. 17/948,635, mailed Mar. 27, 2024, 8 pgs.

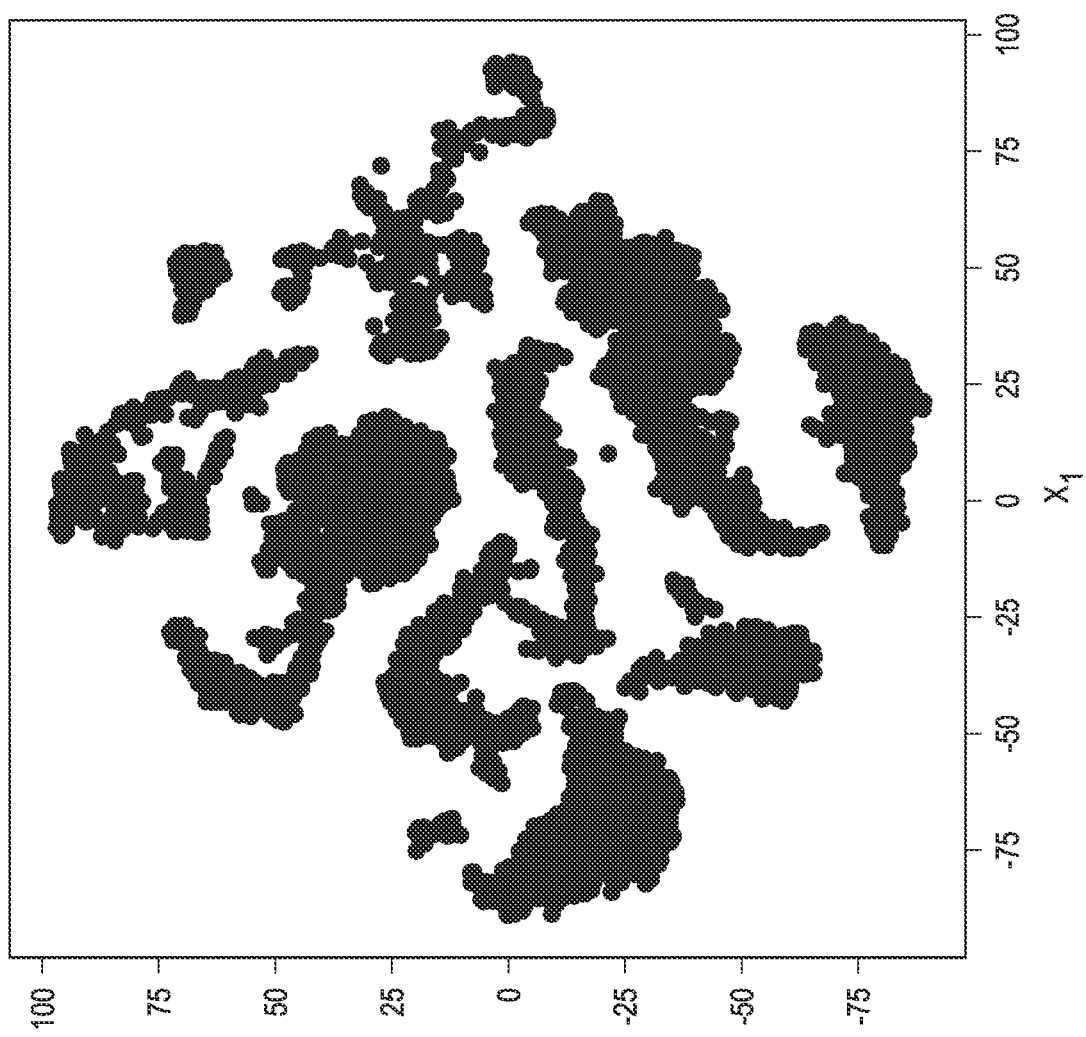

SYSTEM AND METHOD FOR INCREMENTAL TRAINING OF MACHINE LEARNING MODELS IN ARTIFICIAL INTELLIGENCE SYSTEMS, INCLUDING INCREMENTAL TRAINING USING ANALYSIS OF NETWORK IDENTITY GRAPHS

RELATED APPLICATION(S)

This application is a continuation of, and claims a benefit of priority under 35 U.S.C. 120 of, U.S. patent application Ser. No. 17/669,554, filed Feb. 11, 2022, entitled "SYSTEM AND METHOD FOR INCREMENTAL TRAINING OF MACHINE LEARNING MODELS IN ARTIFICIAL INTELLIGENCE SYSTEMS, INCLUDING INCREMENTAL TRAINING USING ANALYSIS OF NETWORK IDENTITY GRAPHS," now U.S. Pat. No. 11,710,078, which is a continuation of, and claims a benefit of priority under 35 U.S.C. 120 of, U.S. patent application Ser. No. 17/180,357 filed Feb. 19, 2021, entitled "SYSTEM AND METHOD FOR INCREMENTAL TRAINING OF MACHINE LEARNING MODELS IN ARTIFICIAL INTELLIGENCE SYSTEMS, INCLUDING INCREMENTAL TRAINING USING ANALYSIS OF NETWORK IDENTITY GRAPHS," now U.S. Pat. No. 11,295,241, the entire contents of which are hereby expressly incorporated by reference for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to artificial intelligence computing systems. In particular, this disclosure relates to the application of machine learning in artificial intelligence computing systems. Specifically, this disclosure relates to the incremental training of machine learning models in artificial intelligence computing systems. Even more specifically, this disclosure relates to the incremental training of machine learning models in artificial intelligence computing systems that utilize graph based analysis, including graph based analysis of identity management artifacts.

BACKGROUND

The use of machine learning in computing systems has been steadily increasing, such that machine learning is now applied to a wide variety of tasks across a large swath of computing contexts. Typically, a machine learning model is trained or tested on a set of data and then deployed (e.g., in a production environment associated with an enterprise) to evaluate data that is different, or new, relative to the training dataset. To increase the efficacy of such models they are usually trained or tested on data associated with the production environment in which they are to be deployed (e.g., an enterprise's data).

In the main then, the quality of the machine learning model is heavily dependent on the data used to train that model, and the efficacy (e.g., performance) of a deployed model is dependent on the congruence of the data being evaluated by the machine learning model with the dataset used to train the model. Thus, for any machine learning environment data is one of, if not the most, important component. Problematically, the amount of data in a given machine learning environment is ever increasing—there will never be less data available than was originally used to train the machine learning model. When a machine learning model is deployed (e.g., in an enterprise environment), all the data pertinent to that machine learning model obtained by the enterprise, or evaluated by the machine learning model from that point forward, is incoming new data that comprises the corpus of data relevant to the machine learning task. The growth of data can thus originate from a variety of sources. Such new data may include the operational data of the enterprise; the providers of the computing platforms or systems that utilize machine learning models may include new enterprises or portions of enterprises with additional data; or new types of data (or features) may be added to machine learning models.

There can be no guarantee, however, that this new data adheres to the same patterns, distributions or other characteristics of an original dataset used to train the machine learning model. This is sometimes referred to as data drift. In fact, as the size of datasets grow, the likelihood of the characteristics of that new data straying from the patterns of the original dataset usually increases. When these patterns (e.g., characteristics) of the data changes, the performance of that machine learning model on that data may likewise degrade on such data, adversely affecting that model predictive accuracy. This problem can be exacerbated by other circumstances as well, such as an enterprise's policies regarding such data.

To address this problem machine learning models can be trained at some time interval (e.g., every hour, every day, etc.) on a new dataset that includes data that has been collected over some period of time subsequent to when that model was deployed. The newly trained model can then replace the previous model. This continuous training process is problematic for a number of reasons, including that a training process consumes a large volume of computing resources and is time consuming. Additionally, the storage of large datasets as they are accumulated over time for the purposes of model training may be difficult, and also require large amounts of computing resources.

Moreover, it may be difficult to even determine when such a machine learning model should again be trained. Specifically, the evaluation of a machine learning model's performance may require data (e.g., what is known as the "ground truth") that is not available to the trainers or providers of the machine learning model. It is unfeasible for a provider of a computing platform including or utilizing the machine learning model to constantly inquire of its users (e.g., enterprises' that utilize such computing platforms) for feedback or additional data to evaluate the machine learning models it provides.

Accordingly, it is desirable to provide improved machine learning training that reduces or eliminates the need to continuously train machine learning models and that speed such machine learning training.

SUMMARY

As discussed, machine learning is now applied to a wide variety of tasks across a large swath of computing contexts. It may be useful here to illustrate one specific context in which machine learning models may be usefully employed. Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

These identity management systems may have many different components that generate different outputs, including data, recommendations, actions, alerts, actions, notifications, etc. Some of these components may utilize machine learning models to determine or assist in determining such outputs. Specifically, an identity management system may store identity management data on identity management data obtained from sources within an enterprise environment. This identity management data, or data derived therefrom, may be utilized to train machine learning models to provide (or which are utilized in providing) the outputs (e.g., data, recommendations, actions, alerts, actions, notifications, etc.) of the identity management system. A user may interact with the identity management system through a user interface to access or manipulate data on identities, roles, entitlements, events or generally perform identity management with respect to enterprise environment, including obtaining outputs determined based on the machine learning models employed by the identity management system.

Thus, these identity management environments that utilize machine learning models represent a microcosm of the more general problems discussed above with respect to computing systems that employ machine learning generally. Namely, that the patterns of data obtained from, produced by, or otherwise associated with the enterprise may drift (be different or comprise different patterns) from the original data used to train the machine learning model such that the machine learning model becomes less performant with respect to evaluating data utilized by the enterprise. Accordingly, the same questions arise with respect to identity management systems that employ machine learning as those that arise with respect to machine learning artificial intelligence systems more generally. Specifically, how can the machine learning model training employed by such systems be implemented such that the need to continuously train machine learning models is reduced and the performance (e.g., speed) of such machine learning training improved while simultaneously reducing the resource requirements of such machine learning training.

Embodiments as disclosed herein may address these issues, among others, by incrementally training machine learning models. The incremental training of machine learning deployed in artificial intelligence systems may solve problems stemming from the inability of such models to adapt to changing data patterns or to new data. The incremental training of these models may serve to retain the previous "knowledge" of the machine learning model (e.g., as gleaned from previous training of that model) and append new knowledge (e.g., as gleaned from any subsequent or different data) to that previous knowledge. This results in, among other things, an incrementally trained model that is updated with the latest data patterns and does not suffer from performance loss.

Such incremental training may be driven by the evaluation of datasets, including a dataset (or portion thereof) that was used to train the machine learning model (at a first time) and a subsequent (or otherwise different) second dataset comprising data determined subsequently to the training (or deployment) of the machine learning model (or which is otherwise different). In particular, the first dataset (e.g., the initial or training dataset) can be compared with (or otherwise evaluated with respect to) the second (different or subsequent) dataset to determine a drift measure. This drift measure may comprise a drift indicator such as a numerical indicator, a textual indicator, or some other indictor indicative of a drift or difference between the first dataset and the second dataset. Based on the drift measure it can be determined if an incremental training of the machine learning of the model is warranted.

Specifically, a drift detection model may be applied to the first and second dataset to determine the drift measure. In one embodiment, the drift detection model may be trained or otherwise determined based on the first dataset (e.g., the dataset that was used to train the machine learning model at the first point in time). This training may, for example, including the determination of one or more metrics associated with the first dataset that may be used in the determination of drift relative to a second dataset. In this manner, the drift detection model can be tailored specifically to the associated machine learning model (or models) trained on that same dataset (or a portion thereof). Examples of such drift detection models include drift detection models based on a Probably Approximately Correct (PAC) learning model, Adaptive Windowing, Hoeffding's bounds, Kolmogorov-Smirnov windowing, Wasserstein distance, Kullback-Leibler divergence, Jenson-Shannon method, T-test, box plots, histograms, or other types of drift detection models.

It will be noted that in many cases such drift detection models may be more useful with, or confined to, numerical data. However, in certain instances of identity management systems a dataset used to train a machine learning model may be categorical data, or derived from categorical data, obtained or determined from an enterprise with which the identity management system is deployed. This data may include, for example, identities and identity attributes, role attributes, entitlements, relationships, or categorical data on other identity management artifacts. Such identity management data can be represented, for example, in an identity graph. As the identity management data of the enterprise changes the identity graph representing such identity management data may likewise change. For these types of artificial intelligence identity management systems then, in many cases machine learning models may be trained on these identity graphs or features or attributes derived from such graphs. As such, if the patterns represented in the identity graph change (e.g., because of new data being represented) the performance of the machine learning models trained based on these identity graphs may suffer, as discussed above. Thus, the datasets which may be desired to compare with a drift detection model in such identity management systems may be these identity graphs themselves (or features, aspect, attributes, or subgraphs of these identity graphs). It may be difficult if not impossible (e.g., given time or computing resource constraints) to utilize drift detection models that compare large graphs directly due to, for example, the exponential nature of node and edge companions.

As mentioned above, however, many drift detection models may be more performant (or simpler to implement) on numerical data. Thus, such drift detection models may not be effectively utilized with categorical data or these types of identity graphs. Therefore, in some embodiments, to implement drift detection with respect to identity graphs in certain artificial intelligence identity management systems, graph embeddings may be utilized. A graph embedding model may be used to transform the nodes, edges or features of a graph into a (e.g., lower dimension) vector representing the nodes or edges or the graph (or portion thereof) embedded. By utilizing graph embedding models that are trained on an identity management graphs, these graph embedding models can be used on new or different graphs (e.g., when an underlying attribute schema remains the same). On the other end, there are a plethora of machine learning algorithms that can work with embeddings.

Thus, by generating a first graph embedding for a first identity graph (e.g., representing a first dataset from a first time) and a second graph embedding for a second identity graph representing a second dataset (e.g., from a subsequent time or otherwise different from the first dataset), a drift detection model may be applied to the first and second graph embeddings (e.g., the graph embeddings may comprise the first and second dataset to which the drift detection model may be applied) to determine a drift measure between the first and second identity graphs. In fact, in certain embodiments the same drift detection model that may be applied to numerical data (e.g., other datasets in the identity management system) may be applied to detect drift in the identity graph embeddings generated by the system. Moreover, by utilizing these graph embeddings, changes in various specific aspects and drifts in the identity graphs may be detected. For example, certain nodes or edges of the graph may be associated with identities, entitlements or roles. Certain relationships or edges of the graph may be associated with connection weights between the nodes representing theses identity management artifacts (e.g., identities, roles, entitlements, etc.). By scoping the graph to certain nodes or edges and embedding only these scoped nodes or edges of the identity graphs, the application of a drift detection model to the embeddings of a first identity graph and a second identity graph may be able to detect drift in particular identity management artifacts (e.g., identities, roles, entitlements, etc.) or relationships between those identity management artifacts. For example, drift detection may be used to detect drift in the identities or roles represented by two identity graphs or detect drift in the relationships between identities or roles, or roles and identities, etc.

Thus, the application of a drift detection model to the first dataset and the second dataset may produce a drift measure. In one embodiment then, the drift measure produced by the application of the drift detection model to the first dataset and the second dataset can be compared to a threshold or range (used here interchangeably) associated with a "drift zone" such that if the drift measure falls within that drift zone range (or above, or below, that threshold or range, etc.) it can be determined that incremental training of the machine learning model (e.g., initially trained on the first dataset) should be undertaken (e.g., the data has drifted significantly enough between the first dataset and the second dataset that incremental training is warranted).

In some embodiments, there may be an additional threshold or range (again used herein interchangeably) associated with a warning zone such that if the drift measure falls within that warning zone range (or above or below that threshold or range, etc.) a warning action may be taken such as raising a notification or alert to a user associated with the enterprise or the provider of the machine learning artificial intelligence system that a data drift is occurring. As another example, there may one or more additional thresholds or ranges associated with a major drift zone such that if the drift measure falls within that major drift zone range (or above or below that threshold or range, etc.) it can be determined that complete retraining of the machine learning model (e.g., initially trained on the first dataset) should be undertaken (e.g., the data of the first dataset and the second dataset are so different that a complete retraining of the machine learning model is needed).

Moreover, in certain embodiments, the outputs of a drift detection model (e.g., the drift detection measure at various points in time) and other data regarding the datasets evaluated by the drift detection model, a drift prediction model may be trained to predict when changing data may drift significantly from previous data. Such a drift prediction model may be used as a predictive tool to predict when drift between two or more datasets may be within a range or threshold (e.g., when the drift measure may reach a certain threshold or zone). Such a model may be, for example, a simple linear or pairwise/segmented (or other type of) regression model. Other types of drift prediction models may be a recurrent neural network or other type of advance machine learning model (e.g., if data drifts observe some periodicity, etc.). Such a drift prediction model can be used for predicting drift. In other words, a drift prediction machine learning model may be trained on data points output from the drift detection model to determine to predict when a "drift zone" may actually be entered. When such drift can be predicted users may be made aware of such drift in advance, where such drift may indicate a problem with the user's enterprise environment (e.g., its identity governance or the like). Such predictive drift may also be used by the machine learning system itself to, for example, determine or implement an incremental training frequency for utilized machine learning models.

In any event, at the point where it is determined that incremental training of the machine learning model is warranted (e.g., the drift measure produced by the drift detection model for the first and second data set is within the drift zone range), the artificial intelligence system may undertake such incremental training of the machine learning model. Such incremental training uses the existing machine learning model (e.g., previously trained) as a base and appends new "knowledge" to that existing model (e.g., by changing parameters, features, weights, biases, trees, etc. of that previously trained model).

In particular, embodiments may utilize the properties of the machine learning model to train the machine learning model incrementally, retaining the previously learned knowledge and appending to that knowledge. This results in a machine learning model that is updated with the latest data patterns of the newer data and does not suffer from performance loss. The incremental training of machine learning models can be achieved by several techniques. In weight modification the weights of the model used to make a decision are modified. In a tree-based ensemble model, appending or a regeneration approach works in which the models can be appended with new nodes or trees trained on new data. In a replacement technique, randomly or statically selected nodes or trees from the machine learning model may be replaced with new nodes or trees trained on new data.

For example, in certain embodiments one method that may be used to incrementally train a model may include modification. In this approach, the weights or decision thresholds within the model may be modified. This can be accomplished by loading an existing model into memory and fitting the model on the new data. Then the model can be tested on both the old data (e.g., first dataset) and the new data (e.g., second dataset or portions of the second dataset different than the first dataset) to check the performance of the resulting model.

In regeneration, a new model or a subset of a new model, like some decision trees in case of random forest model, is built and appended to the old model, or is used in conjunction with the old model to make an informed decision. When appending to the old model, the number of instances of the new model can be greater or fewer depending on the changes within the old and new data and also the size of both datasets. When working together instead of appending the models, both the old model and new model may have different weightage or voting power regarding final prediction based on the amount of data these models were trained on and represent in the next batch of test data.

Incremental training may also use a replacement approach where a subset or portion of the previously trained model (e.g., trained on the first dataset) is replaced with a new model that is trained on new data. This replacement may be based on certain thresholds or based on how much new data (e.g., of the second dataset) is available compared to the old dataset (first dataset). For example, in the case of a random forest model of two hundred trees trained on old data, fifty trees can be randomly removed and replaced by new trees which are trained on the new data (e.g., with same schema). This results in a model that can generalize well over both the old and the new dataset.

Additionally, there may be other methods that can be employed to incrementally train the machine learning model, although which method to use for incremental training may depend on the original machine learning trained, the availability and size of the new data and whether there is a concept drift between the first dataset on which the model was originally trained and the second (e.g., new) dataset.

Again, it will be noted the type of incremental training undertaken may be dependent the type of the machine learning model being incrementally trained. For example, in cases where the machine learning model is a random forest model, in one embodiment, the previously trained model may be loaded and incrementally trained on the new (second) dataset or a new dataset comprising (e.g., an equal batch) of old data (from the original first dataset) and new data (from the second dataset or a portion of the second dataset different from the first dataset). The performance of the incrementally trained machine learning model (the new model) can be monitored or determined such that if the newly incrementally trained model has desired performance on both the first dataset and the second dataset then it can be established that the incrementally trained model has been updated for both the first and the second dataset (e.g., it is performant on patters of both data).

As another embodiment of incremental training of a random forest model, a smaller forest (decision trees) may be trained on the new data of the second dataset (or an ensemble of both old data from the first dataset and new data in the second dataset) and appended to the existing (e.g., previously trained) machine learning model for combined prediction on both datasets. Here, weights can be given to both predictors to make a combined prediction where the weights can be based on the amount of data in old dataset and new dataset.

For machine learning models that are neural networks, they may be trained on the second dataset. However, training on just the second (new) dataset may lead to catastrophic forgetting whereby the machine learning model may "forget" patterns of the older data on which it was trained (e.g., the first dataset) when it is trained on the new data (e.g., the second dataset). Thus, in certain embodiments, the machine learning model may be trained on a combination of old data and new data (e.g., data from the first and second datasets). The incrementally trained model can then be evaluated (e.g., the performance) to determine if catastrophic forgetting has occurred in the incrementally trained model. If the performance of the incrementally trained machine learning model on data of the first dataset is below a performance threshold the machine learning model can once again be incrementally trained.

In other embodiments there may be other methods that can be employed to incrementally train the machine learning models, where the method to use for incremental training depends on the original machine learning model used, availability and size of the new data or whether there is a concept drift between the old data and the new data.

In one embodiment, then, an identity management system may function by obtaining a first dataset, wherein a first machine learning model used by the machine learning system is trained based on the first dataset and the first dataset comprises data determined based on an identity graph at a first time. The identity graph may be determined by obtaining identity management data from one or more identity management systems in a distributed enterprise computing environment, the identity management data comprising data on a set of entitlements and a set of identities utilized in identity management in the distributed enterprise computing environment. The identity management data can be evaluated to determine the set of identities and the set of entitlements associated with the set of identities and the identity graph generated from the identity management data by creating a node in the first identity graph for each of the determined set of identities, creating a node in the identity graph for each of the set of entitlements, and for each first identity that has an entitlement of the set of entitlements and creating an edge in the identity graph representing a relationship between a first node representing the first identity and a second node representing the entitlement.

At some point, a second dataset can be obtained wherein the second dataset comprises data determined based on the identity graph at a second time. The drift detection model can be applied to the second dataset to determine a drift measure between the second dataset and the first dataset. The drift measure can be compared to a drift zone. When the drift measure is within the drift zone, the first machine learning model can be incrementally trained using a third dataset comprised of data including data from the first dataset and second dataset; and when the drift measure is within the major drift zone, a second machine learning model can be trained for use in the machine learning system and replacing the first machine learning model with the second machine learning model.

In some embodiments, the drift prediction model was trained on the same first dataset used as a basis for training the first machine learning model.

In a particular embodiment, the first dataset comprises data generated from performing graph embedding on at least a portion of the identity graph at the first time and the second dataset comprises data generated from performing graph embedding on at least the portion of the identity graph at the second the time. Such a graph embedding can be performed, for example, using a graph embedding model.

Embodiments provide numerous advantages over previously available systems and methods for training machine learning models. Embodiments may result in an updated, more accurate machine learning model without having to retrain the entire model from scratch. Another advantage is that based on the amount of new data or the change of patterns in the new data, it can be determined how much importance needs to be given to the new instances so that a resulting model has a preference between old patterns and new patterns. The system may be able to append or leverage existing knowledge determined from datasets. Moreover, no model training may be done unless it is determined to be needed, and when needed and the training of machine learning models may be faster, as the training is incremental as opposed to having to retrain entirely new machine learning models on a potentially larger set of data.

Additionally, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments of identity graphs and clustering approaches by reducing the computation time and processor cycles required (e.g., and thus improving processing speed) and simultaneously reducing memory usage or other memory requirements.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 6E depicts an example visual representations of an embedding of an identity graph.

DETAILED DESCRIPTION

Figure 1:
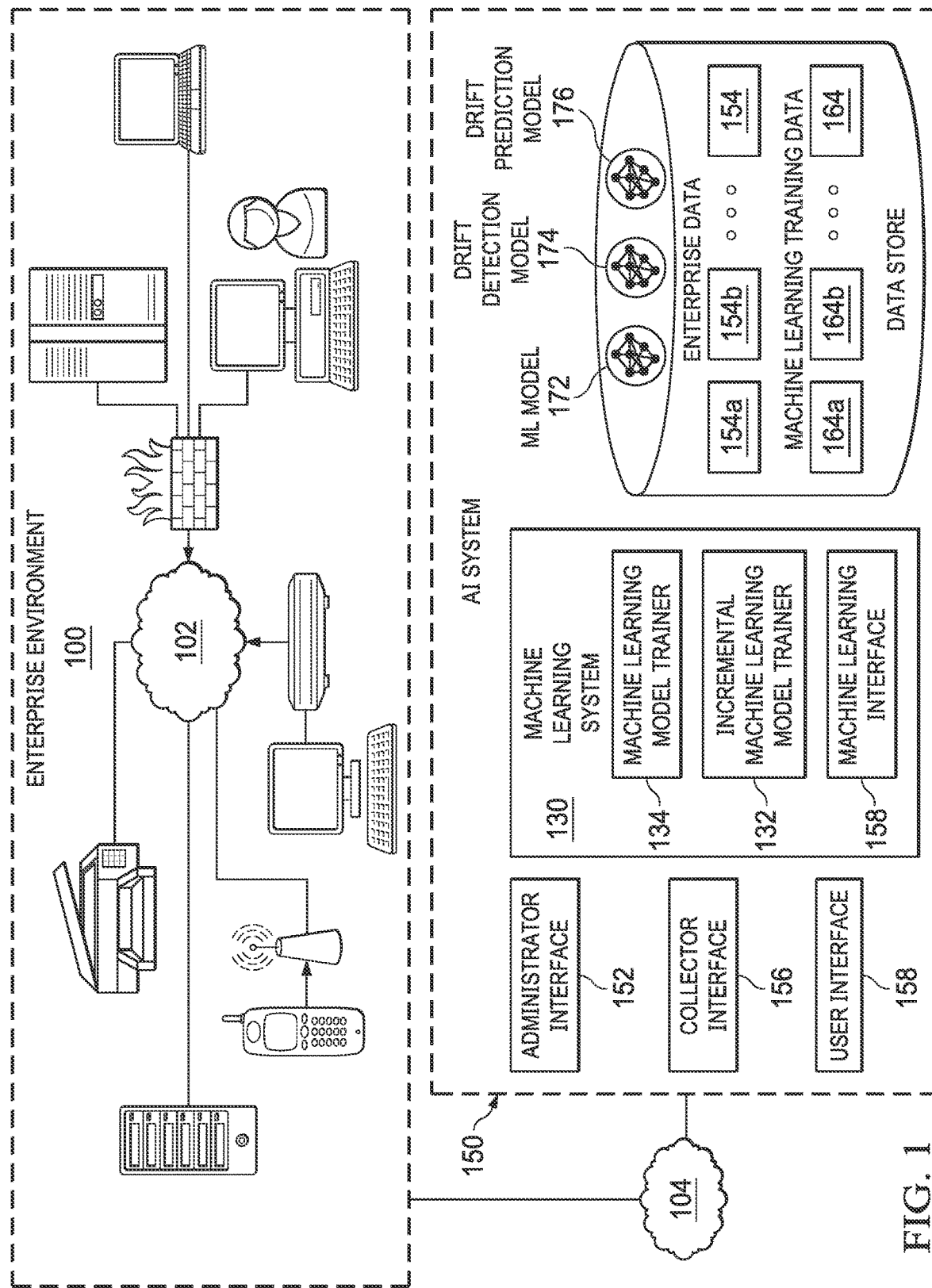
FIG. 1 is a block diagram of a distributed networked computer environment including one embodiment of a machine learning system adapted for incremental training.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more details regarding the specific embodiments disclosed herein, some context may be helpful. As discussed, the use of machine learning in computing systems has been steadily growing. The use of such machine learning models usually involves training or testing the machine model on a set of data and then deploying the machine model (e.g., in a production environment associated with an enterprise) to evaluate data that is different, or new, relative to the training dataset. To increase the efficacy of such models they are usually trained or tested on data associated with the production environment in which they are to be deployed (e.g., an enterprise's data).

In the main then, the quality of the machine learning model is heavily dependent on the data used to train that model, and the efficacy (e.g., performance) of a deployed model is dependent on the congruence of the data being evaluated by the machine learning model with the dataset used to train the model. Data is always growing, however. When a machine learning model is deployed (e.g., in an enterprise environment), all the data pertinent to that machine learning model obtained by the enterprise, or evaluated by the machine learning model from that point forward, is incoming new data that comprises the corpus of data relevant to the machine learning task. There can be no guarantee, however, that this new data adheres to the same patterns, distributions or other characteristics of an original dataset used to train the machine learning model. This is sometimes referred to as data drift. When these patterns (e.g., characteristics) of the data changes, the performance of that machine learning model on that data may likewise degrade on such data, adversely affecting that model predictive accuracy.

Using a continuous training process for such machine learning models is problematic for a number of reasons, including that a training process consumes a large volume of computing resources and is time consuming. Additionally, the storage of large datasets as they are accumulated over time for the purposes of model training may be difficult, and also require large amounts of computing resources. Moreover, it may be difficult to even determine when such a machine learning model should again be trained. Specifically, the evaluation of a machine learning model's performance may require data (e.g., what is known as the "ground truth") that is not available to the trainers or providers of the machine learning model. It is unfeasible for a provider of a computing platform including or utilizing the machine learning model to constantly inquire of its users (e.g., enterprises' that utilize such computing platforms) for feedback or additional data to evaluate the machine learning models it provides.

Accordingly, it is desirable to provide improved machine learning training that reduces or eliminates the need to continuously train machine learning models and speed such machine learning training. Specifically, how can the machine learning model training employed by such systems be implemented such that the need to continuously train machine learning models is reduced and the performance (e.g., speed) of such machine learning training improved while simultaneously reducing the resource requirements of such machine learning training.

Embodiments as disclosed herein may address these issues, among others, by incrementally training machine learning models. The incremental training of machine learning deployed in artificial intelligence systems may solve problems stemming from the inability of such models to adapt to changing data patterns or to new data. The incremental training of these models may serve to retain the previous "knowledge" of the machine learning model (e.g., as gleaned from previous training of that model) and append new knowledge (e.g., as gleaned from any subsequent or different data) to that previous knowledge. This results in, among other things, an incrementally trained model that is updated with the latest data patterns and does not suffer from performance loss.

Such incremental training may be driven by the evaluation of datasets, including a dataset (or portion thereof) that was used to train the machine learning model (at a first time) and a subsequent (or otherwise different) second dataset comprising data determined subsequently to the training (or deployment) of the machine learning model (or which is otherwise different). In particular, the first dataset (e.g., the initial or training dataset) can be compared with (or otherwise evaluated with respect to) the second (different or subsequent) dataset to determine a drift measure. This drift measure may comprise a drift indicator such as a numerical indicator, a textual indicator, or some other indictor indicative of a drift or difference between the first dataset and the second dataset. Based on the drift measure it can be determined if an incremental training of the machine learning of the model is warranted.

Turning first to FIG. 1 then, a distributed computer environment including one embodiment of an artificial intelligence system that employs a machine learning model and incremental training of that machine learning model is depicted. It will be noted before discussing embodiments further that the example architectures and deployments of artificial interlaces systems employing machine learning models and their incremental training that are given herein are given by way of illustration without loss of generality and that embodiments of the systems and methods for incremental training of machine learning models described herein will be applicable and effective in almost any context where machine learning is employed and data partying to those machine learning tasks is changing.

Referring again to figure, then, a distributed networked computer environment including one embodiment of an artificial intelligence system 150 system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization that employs a computing environment). Users may have various roles, job functions, responsibilities, etc. to perform within various processes or tasks associated with enterprise environment 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Such activity, or more generally, almost any computing activity associated with the enterprise may generate data related to that activity.

Artificial intelligence system 150 may provide some degree of functionality with respect to enterprise computing environment 100. In particular, the artificial intelligence system 150 offers one or more interfaces by which computing systems of the enterprise 100 or users of the enterprise may obtain outputs (e.g., data, recommendations, actions, alerts, actions, notifications, etc.) from the artificial intelligence system 150. Specifically, such an artificial intelligence system 150 may provide an administrator interface 152 or a user interface 158 (e.g., an API, a RESTful interface, a browser based interface, etc.) through which administrators, users (e.g. human users or computing systems within enterprise 100) may interact with the artificial intelligence system 150 to, for example, configure the artificial intelligence system 150, provide or obtain data, or request or obtain outputs from the artificial intelligence system 150. Note here, that while the artificial intelligence system 150 has been depicted in the diagram as separate and distinct from the enterprise environment 100 and coupled to enterprise environment 100 over a computer network 104 (which may the same as, or different than, computer network 102), it will be realized that such an artificial intelligence system 150 may be deployed as part of the enterprise environment 100, remotely from the enterprise environment, as a cloud based application or set of services, or in another configuration.

To provide such outputs then, the artificial intelligence system 150 may employ a machine learning system 130 that trains, tests or utilizes one or more machine learning models 172. This machine learning model 172 may be trained or tested based on data produced or otherwise associated with the enterprise environment 100. Accordingly, at some time interval, collectors 156 of the artificial intelligence system 150 may request or otherwise obtain data from various touchpoint systems within enterprise environment 100, or systems external to the enterprise environment 100. The enterprise data 154 obtained in association with the enterprise 100 at a point in time may be stored at the artificial intelligence system 150. Such enterprise data 154 may be further processed in some manner (e.g., features extracted, values determined, etc.) to determine an associated dataset of machine learning training data 164. Machine learning model trainer 134 can then utilize an enterprise dataset 154 or a machine learning training dataset 164 to train machine learning model 172. This machine learning model 172 can then be used by artificial intelligence system 150 in the generation of outputs. In particular, the machine learning model 172 can be accessed through machine learning interface 158 to, for example, obtain predictions, classifications or other output from the machine learning model 172 for use in generating output by the artificial intelligence system 150.

As discussed, using a continuous training process for machine learning model 172 may consume a large volume of computing resources and time. This is because such a continuous training process may entail the collection of enterprise data 154 at first time followed by the determination of a machine learning training dataset 164 and the full training of a machine learning model 172. Subsequently the process (e.g., obtaining enterprise data 154, determining machine learning training set 164, full training of the machine learning model 172, etc.) may be repeated each time enterprise data 154 associated with the enterprise is updated or at some regular time interval. Additionally, the storage of large datasets 154, 164 as they are accumulated over time for the purposes of model training may be difficult, and also require large amounts of computing resources. Moreover, artificial intelligence system 150 may not have access to the "ground truth" associated with such machine learning models 172 as they may be internal to enterprise environment 100 or otherwise inaccessible by the artificial intelligence system 150. Thus, there may be not effective way to analyze the performance of machine learning model 172 to alter such a training regimen.

Accordingly, machine learning system 130 may include incremental machine learning model trainer 132. Incremental model trainer 132 may serve to determine when machine learning model 172 should be incrementally trained and then incrementally train the machine learning model 172 when it is determined that the machine learning model 172 should be incrementally trained. The incremental training of the machine learning model 172 deployed in artificial intelligence system 150 may solve problems stemming from the inability the model 150 to adapt to changing data patterns or to new data in datasets 154. The incremental training of the model 172 may also serve to retain the previous "knowledge" of the machine learning model 172 and append new knowledge to that previous knowledge. These capabilities result in, among other things, an incrementally trained model that is updated with the latest data patterns and does not suffer from performance loss.

The determination of when incremental training of machine learning model 172 should be undertaken by incremental model trainer 132 may be driven by the evaluation of datasets 154, 164, including a dataset (or portion thereof) (e.g., one or a combination of datasets 154*a*, 164*a*) that was used to train the machine learning model (at a first time) and a subsequent (or otherwise different) second dataset (e.g., one or a combination of datasets 154*b*, 164*b*) comprising data determined subsequently to the training (or deployment) of the machine learning model 172 (or which is otherwise different). Such a determination may be undertaken at a certain time interval, when a threshold amount of new data is determined or some other basis.

In particular, incremental model trainer 132 may compare a first dataset (e.g., the initial or training dataset) 154*a*, 164*a* with (or otherwise evaluated with respect to) the second (different or subsequent) dataset 154*b*, 164*b* to determine a drift measure. This drift measure may comprise a drift indicator such as a numerical indicator, a textual indicator, or some other indictor indicative of a drift or difference between the first dataset and the second dataset. Based on the determined drift measure incremental model trainer 132 can determine if an incremental training of the machine learning model 172 is warranted.

Suppose for example, a machine learning training dataset 164*a* is used to train machine learning model 172 at a first time (e.g., by machine learning model trainer 134). The machine learning training dataset 164*a* may have, for example, been determined from enterprise data 154*a* obtained from enterprise environment at the first time (or previous to the first time). Now suppose that a second dataset 154*b* is collected from enterprise environment 100 at a second time (e.g., subsequent to the first time) and machine learning training data 164*b* is determined from this second dataset 154*b*. In this case, incremental model trainer 132 may compare the first machine learning training dataset 164*a* to the second machine learning training dataset 164*b* to determine a drift measure comprising a drift indicator indicative of a drift or difference between the first machine learning dataset 164*a* and the second machine learning dataset 164*b*. In some cases, the enterprise data 154*a* from the first time may be compared against the enterprise data 154*b* from the second time to determine the drift measure. Such comparison may entail, for example, the application of drift detection model 174 to the second machine learning dataset 164*b* or both the first machine learning dataset 164*a* and the second machine learning dataset 164*b*. Based on the determined drift measure, incremental model trainer 132 can determine if an incremental training of the machine learning model 172 is desired. It will also be noted that that incremental model trainer 132 may determine whether incremental training of model 172 is desired based on a determination of a drift measure associated with enterprise dataset 154*a* from a first time and enterprise dataset 154*b* from a second time or both the difference between the first machine learning dataset 164*a* and the second machine learning dataset 164*b* and the difference between enterprise dataset 154*a* from a first time and enterprise dataset 154*b* from a second time or a difference between a combination of datasets from the first time and a combination of datasets from a second time, etc.

To determine such a drift measure, the incremental model trainer 132 may apply a drift detection model 174 to at least one of the datasets for which it is desired to determine the drift measure. In one embodiment, the drift detection model 174 may be trained or otherwise determined based on the first dataset (e.g., the dataset 164*a* that was used to train the machine learning model 172 at the first point in time or the enterprise dataset 154*a* that was used to determine the machine learning dataset 164*a* used to train the machine learning model 172). This training may, for example, including the determination of one or more metrics associated with the first dataset (e.g. dataset 154*a* or 164*a*) that may be used in the determination of drift relative to a second dataset. In this manner, the drift detection model 174 can be tailored specifically to the first dataset on which the associated machine learning model 172 was trained (or a portion thereof), and thus to the associated machine learning model 172. Continuing with the above example, if machine learning model trainer 134 trains machine learning model 172 at a first time using machine learning training dataset 164*a*, the incremental model trainer 134 may train drift detection model 174 on machine learning training dataset 164*a*. This drift detection model 174 could then be applied to evaluate machine learning training dataset 164*b* to determine a difference between the machine learning training dataset 164*a* and the second machine learning training dataset 164*b* and produce a determined drift measure. Examples of such drift detection models include drift detection models based on a Probably, Approximately Correct (PAC) learning model, Adaptive Windowing, Hoeffding's bounds, Kolmogorov-Smirnov windowing, Wasserstein distance, Kullback-Leibler divergence, Jenson-Shannon method, T-test, box plots, histograms, or other types of drift detection models.

Thus, the application of a drift detection model 174 to the first dataset and the second dataset may produce a drift measure. In one embodiment then, machine learning system 130 may compare the drift measure produced by the application of the drift detection model 174 to the first dataset and the second dataset to a threshold or range (used here interchangeably) associated with a "drift zone" such that if the drift measure falls within that drift zone range (or above, or below, that threshold or range, etc.) it can be determined that incremental training of the machine learning model (e.g., initially trained on the first dataset) should be undertaken (e.g., the data has drifted significantly enough between the first dataset and the second dataset that incremental training is warranted).

At the point where it is determined that incremental training of the machine learning model is warranted (e.g., the drift measure produced by the drift detection model for the first and second data set is within the drift zone range), the machine learning system 130 may undertake such incremental training of the machine learning model 172. In particular, incremental machine learning model trainer 132 may obtain the machine learning model 172 and incrementally train this machine learning model 172. Such incremental training may use the existing machine learning model 172 (e.g., previously trained) as a base and appends new "knowledge" to that existing model (e.g., by changing parameters, features, weights, biases, trees, etc. of that previously trained model). In particular, embodiments of incremental machine learning model trainer 132 may utilize the properties of the machine learning model 172 to train the machine learning model 172 incrementally, retaining the previously learned knowledge and appending to that knowledge. This results in a machine learning model 172 that is updated with the latest data patterns of the newer data and does not suffer from performance loss. If the drift measure falls below the drift zone threshold, incremental machine learning model trainer 132 may determine that no incremental training of the machine learning model 172 is warranted.

In some embodiments, there may be an additional threshold or range (again used herein interchangeably) associated with a warning zone such that if the machine learning system 130 determines that the drift measure falls within that warning zone range (or above or below that threshold or range, etc.) a warning action may be taken such as raising a notification or alert to a user associated with the enterprise or the provider of the machine learning artificial intelligence system 150 that a data drift is occurring. As another example, there may one or more additional thresholds or ranges associated with a major drift zone such that if the drift measure falls within that major drift zone range (or above or below that threshold or range, etc.) it can be determined that complete retraining of the machine learning model (e.g., initially trained on the first dataset) should be undertaken (e.g., the data of the first dataset and the second dataset are so different that a complete retraining of the machine learning model is needed). Here, machine leaning model trainer 134 may be utilized to train a new machine learning model based on the newly received data (e.g., or a combination of the newly received dataset and the original dataset used to train the machine learning model, etc.).

Moreover, in certain embodiments, machine learning system 130 may utilize outputs of drift detection model 174 (e.g., the drift detection measure at various points in time) and other data regarding the datasets 154, 164 evaluated by the drift detection model 174 to train a drift prediction model 176 to predict when changing data may drift significantly from previous data. Such a drift prediction model 176 may be used as a predictive tool to predict when drift between two or more datasets 154, 164 may be within a range or threshold (e.g., when the drift measure may reach a certain threshold or zone). Such a drift prediction model 176 may be, for example, a simple linear or pairwise/segmented (or other type of) regression model. Other types of drift prediction models may be a recurrent neural network or other type of advance machine learning model (e.g., if data drifts observe some periodicity, etc.). Such a drift prediction model 176 can be used for predictive drift. In other words, a drift prediction machine learning model 176 may be trained on data points output from the drift detection model 174 to determine to predict when a "drift zone" may actually be entered. When such drift can be predicted users may be made aware of such drift in advance, where such drift may indicate a problem with the user's enterprise environment 100. Such predictive drift may also be used by the machine learning system 130 itself to, for example, determine or implement an incremental training frequency for utilized machine learning models.

As discussed, there are several methods that can be used by incremental model trainer 132 (e.g., using drift detection model 174) to detect data drift where the method to use may be selected based on the type of data in the first and second datasets being evaluated (e.g., numerical data, categorical data or ordinal data). Certain of these drift detection models may, for example, be effectively utilized with numerical data representing values that can be measured and put into a logical order. Examples of numerical data are height, weight, age, number of movies watched, I.Q. etc.

In one embodiment, the drift detection model 174 may be based on a technique termed drift detection method (DDM). DDM is a concept drift detection method which is based on the principle that the learner's error rate will decrease as the number of analyzed samples will increase. The condition behind this logic is that the data distribution is necessary. This model is based on the Probably Approximately Correct (PAC) learning model premise. The model accepts, for example, three tunable parameters. The first parameter is the minimum number of instances that have to be analyzed to detect change. This parameter helps avoiding false drifts based on just a few data points. The next two parameters are warning threshold and the drift threshold. If the error rate increases beyond the warning threshold, then the model may issue a drift warning as a drift measure and if it rises beyond the drift threshold, then a drift detection may be made as a drift measure. Thus, noting that p_min and s_min are minimum recorded error rate and standard deviation, such a drift detection model enters warning zone and drift zone when: Warning zone→ if $pi+si>=p\_min+2*s\_min$ and Drift Zone→ if $pi+si>=p\_min+3*s\_min$.

In another embodiment, the drift detection model 174 may be based on the early drift detection method (EDDM). EDDM is an improvement over the traditional drift detection method as discussed. It aims to improve the detection rate of gradual drift in DDM models but also keep a better performance against abrupt concept drift. This type of model keeps track of the average distance between two errors instead of only the error rate. To do this, drift detection model 174 may also track the running average distance and the running standard deviation, as well as the maximum distance and the maximum standard deviation.

Thus the drift detection model 174 model based on EDDM may work similarly to the DDM algorithm, by keeping track of statistics only. It works with the running average distance ($p\_i^\wedge$) and the running standard deviation ($s\_i^\wedge$), as well as $p^\wedge\_\{max\}$ and $s^\wedge\_\{max\}$, which are the values of $p\_i^\wedge$ and $s\_i^\wedge$ when ($p\_i^\wedge+2*s\_i^\wedge$) reaches its maximum. Such a drift detection model enters the warning zone→ if ($p\_i^\wedge+2*s\_i^\wedge$)/($p^\wedge\_max+2*s^\wedge\_max$)<alpha and the drift zone→ if ($p\_i^\wedge+2*s\_i^\wedge$)/($p^\wedge\_max+2*s^\wedge\_max$) <beta.

Drift detection model 174 may also be based on adaptive windowing, an adaptive sliding window algorithm for detecting change and keeping update statistics about the data stream. The general idea behind adaptive windowing is to keep statistics from a variable sized window to detect drifts. The size of the window to use is adjusted by the drift detection model 174 by cutting the statistics' window at different points and analyzing the average of some statistic over these two windows. If the absolute value of the difference between the two averages surpasses a pre-defined threshold, change is detected at that point and all data before that time is discarded. So once the adrift detection model 174 detects the drift, it may start adjusting to the new data.

In another embodiment, drift detection model 174 may be based on the Hoeffding's inequality. In probability theory, Hoeffding's inequality provides an upper bound on the probability that the sum of bounded independent random variables deviates from its expected value by more than a certain amount. Here drift detection model 174 may return a drift measure as STABLE, WARNING or DRIFT. The drift detection model 174 gives an option to set a drift confidence threshold below which drift is declared and a warning confidence threshold below which warning is issued.

In some embodiments, drift detection model 174 may be based on Kolmogorov-Smirnov windowing (KSWIN). Such a drift detection model 174 may be based on the Kolmogorov-Smirnov (KS) statistical test. In statistics, the Kolmogorov-Smirnov test (K-S test or KS test) is a nonparametric test of the equality of continuous, one-dimensional probability distributions that can be used to compare a sample with a reference probability distribution (one-sample K-S test), or to compare two samples (two-sample K-S test). KS-test is a statistical test with no assumption of underlying data distribution which makes it a good fit for observing either data or performance distributions. The Kolmogorov-Smirnov statistic quantifies a distance between the empirical distribution function of the sample and the cumulative distribution function of the reference distribution, or between the empirical distribution functions of two samples.

KSWIN maintains a sliding window $\Psi$ of fixed size n (window_size). The last r (stat size) samples of $\Psi$ are assumed to represent the last concept considered as R. From the first n-r samples of $\Psi$, r samples are uniformly drawn, representing an approximated last concept W. The KS-test is performed on the windows R and W of the same size. KS-test compares the distance of the empirical cumulative data distribution dist(R,W). A drift measure corresponding with a concept drift may be detected by KSWIN if:

$$dist(R, W) > \sqrt{-\frac{\ln\alpha}{r}}$$

In a particular embodiment, the drift detection model 174 may be based on Wasserstein distance. This is a distance metric defined between two probability distributions in same metric space M. Intuitively, if each distribution is viewed as a unit amount of earth (soil) piled on M, the metric is the minimum "cost" of turning one pile into the other, which is assumed to be the amount of earth that needs to be moved times the mean distance it has to be moved. Because of this analogy, the metric is known in computer science as the earth mover's distance.

The first Wasserstein distance between the distributions u and v is:

$$l_1(u, v) = \inf_{\pi \in \Gamma(u,v)} \int_{\mathbb{R}\times\mathbb{R}} |x - y| d\pi(x, y)$$

where $\Gamma(u,v)$ is the set of (probability) distributions on $\mathbb{R}\times\mathbb{R}$ whose marginals are u and v on the first and second factors respectively.

Other types of drift detection models 174 may be based on Kullback-Leibler (KL) divergence. KL divergence quantifies how one probability distribution P is different from another distribution Q. It is also called as relative entropy. KL divergence can be calculated as the negative sum of probability of each event in P multiplied by the log of the probability of the event in Q over the probability of the event in P. One possible flaw of KL divergence is that it is not symmetric hence values can become infinity and it also does not qualify triangle inequality. KL divergence of P to Q is not equal to the divergence of Q to P.

Consider two distributions of probability P and Q. Usually, P represents the data, the observations, or a probability distribution precisely measured. Distribution Q represents instead a theory, a model, a description or an approximation of P. The Kullback-Leibler divergence is then interpreted as the average difference of the number of bits required for encoding samples of P using a code optimized for Q rather than one optimized for P.

An embodiment of a drift detection model 172 may also be based on Jensen-Shannon divergence. Jensen-Shannon divergence extends KL divergence to calculate a symmetrical score and distance measure of one probability distribution from another. This means that the divergence of P from Q is the same as Q from P, or stated formally as JS(P∥Q)==JS(Q∥P). JS divergence can be calculated as JS(P∥Q)=1/2*D(P∥M)+1/2*D(Q∥M) where M==1/2*(P+Q) and D is KL divergence, calculated using a standard KL divergence method. Jensen-Shannon divergence may be more useful as a measure as it provides a smoothed and normalized version of KL divergence, with scores between 0 (identical) and 1 (maximally different), when using the base-2 logarithm. The square root of the score gives a quantity referred to as the Jensen-Shannon distance, or JS distance for short. The JS distance can thus be used a drift measure and compared to a drift threshold or warning threshold.

Figure 2:
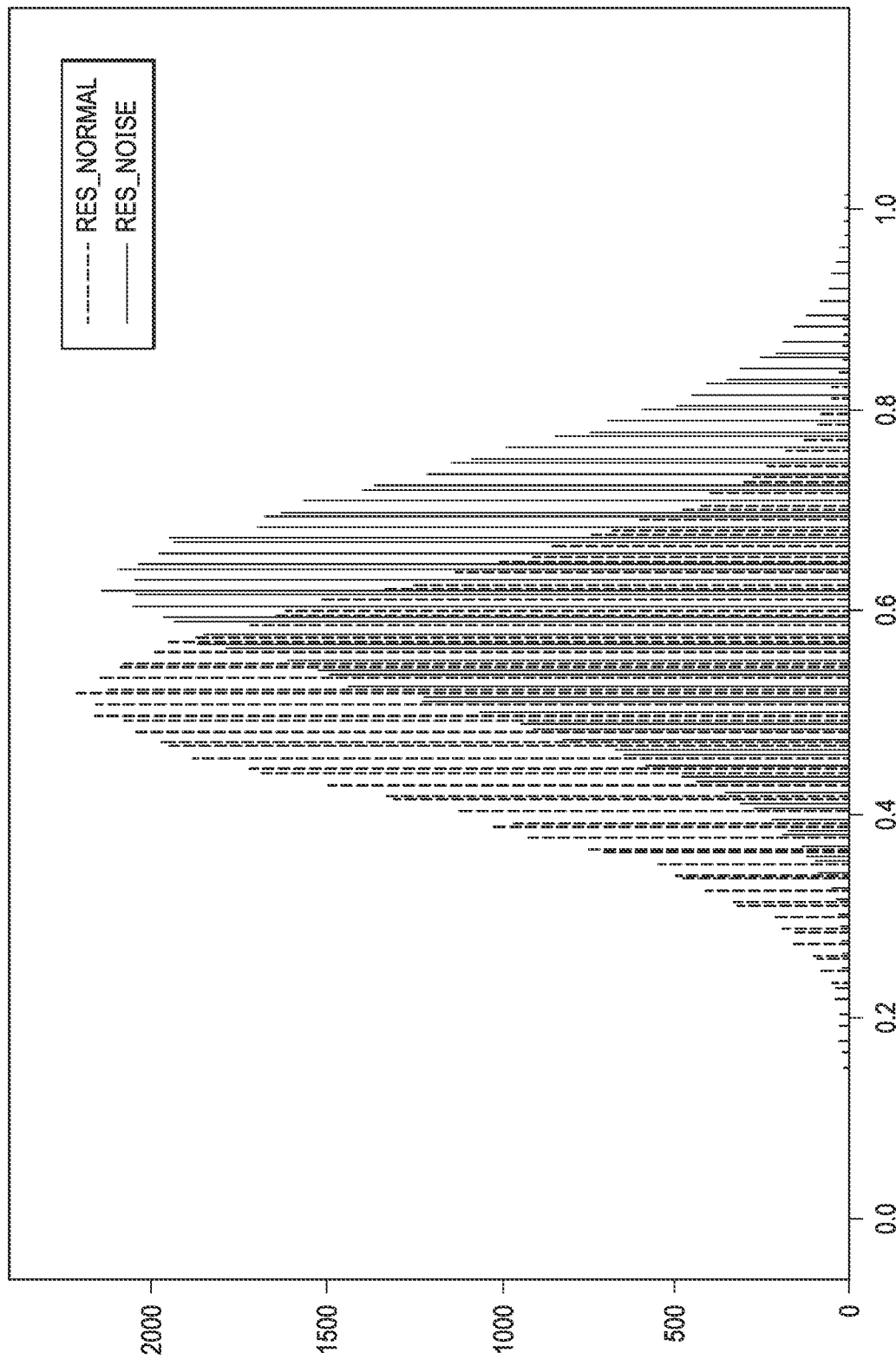
FIG. 2 is a block diagram of an example histogram of datasets.
Figure 3:
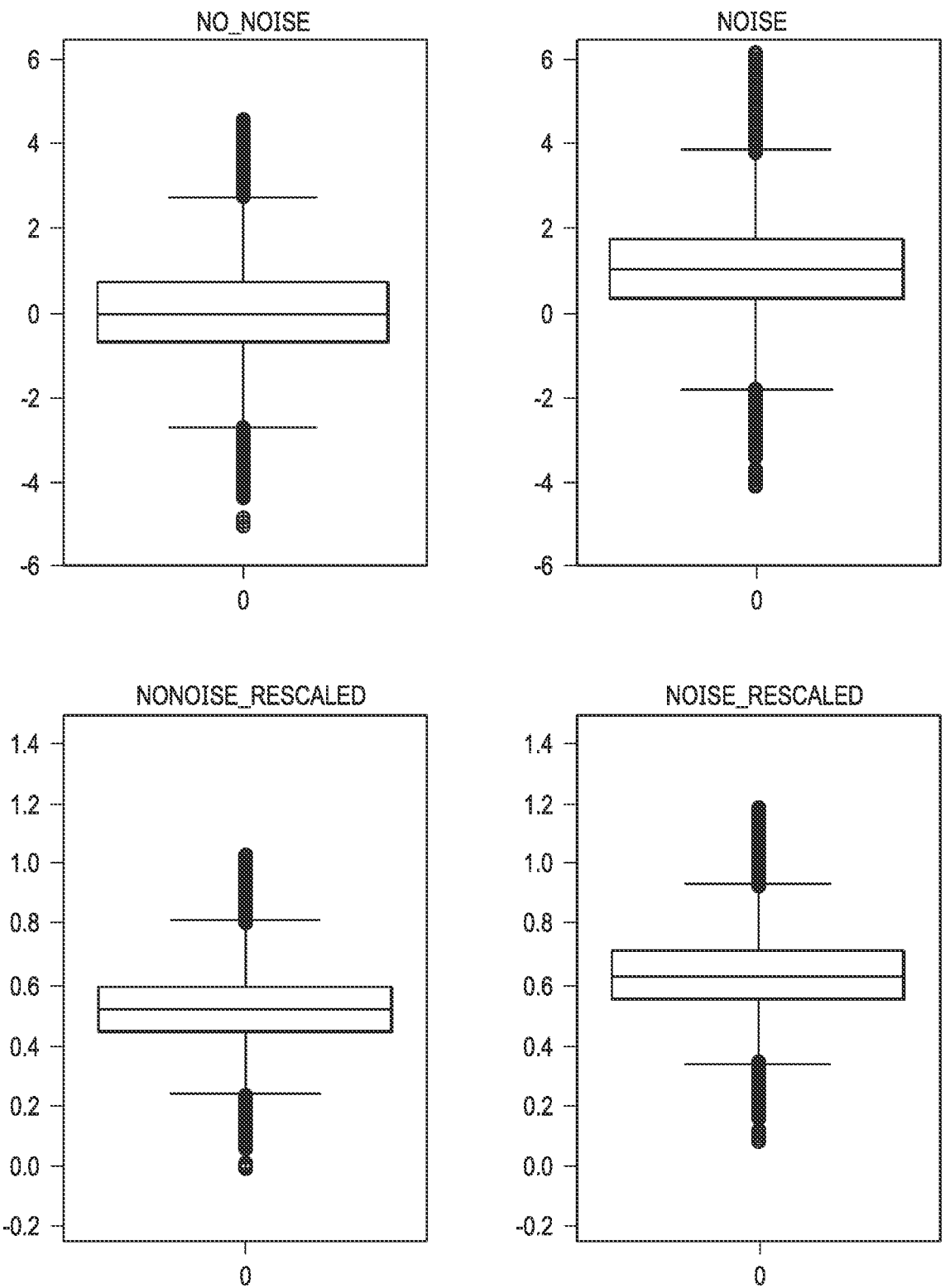
FIG. 3 is a block diagram of an example box plot of datasets.

A drift detection model 174 may also be based or utilize an analysis of histograms created from the first and second datasets under evaluation, or box plots of the first dataset and the second dataset. For example, FIG. 2 depicts a visualization of a histogram of two datasets. Such histograms may allow the visualization of data distribution that may allow detection of a shift between a distribution of a second dataset and an original distribution of a first dataset, and produce a drift measure indicative of such a drift. FIG. 3 depicts example box plots of a dataset (e.g., with noisy data and with noisy data removed, and normal data and rescaled data). Such box plots of data may be analyzed to produce a drift measure based on how data in the two datasets varies around a median and how far from the median outliers are.

Returning to FIG. 1, at the point where it is determined that incremental training of the machine learning model is warranted (e.g., the drift measure produced by the drift detection model for the first and second data set is within the drift zone range), the machine learning system 130 may undertake such incremental training of the machine learning model 172. In particular, incremental machine learning model trainer 132 may obtain the machine learning model 172 and incrementally train this machine learning model 172 on a dataset comprising data from the second datasets (e.g., dataset 154b or 164b) or a combination of the original dataset (e.g., dataset 154a or 164a) used to train the machine learning model 712 and data from the second dataset 154b, 164b. Such incremental training uses the existing machine learning model 172 (e.g., previously trained) as a base and appends new "knowledge" to that existing model (e.g., by changing parameters, features, weights, biases, trees, etc. of that previously trained model).

As noted, one of the main motives behind incremental training of machine learning model is to avoid training a new machine learning model after every fixed term or data collection, even if no underlying data patterns have changed. In some embodiments, the determination to continue to utilize existing machine learning model 172 or incrementally train the machine learning model 172 (or training an entirely new model 172) depends on the drift between a dataset 154, 164 used to train the machine learning model 172, or used to derive the dataset used to train the machine learning model 172 (e.g., initially), and a second dataset 154, 164 (e.g., a dataset subsequently determined or obtained from enterprise environment 100). If no drift is detected, or an extremely minor drift occurs causing no change in the data patterns, (e.g., the drift measure is not within, or below, the drift zone, etc.), the existing model 172 may continue to be utilized.

If, however, minor drift occurs (e.g., the drift measure is in, or above, the drift zone), then incremental model trainer 132 may incrementally train the machine learning model 172. However, training on just the second (e.g., new) dataset may lead to catastrophic forgetting (whereby the machine learning model 172 may "forget" patterns of the older data on which it was trained (e.g., the first dataset) when it is trained on the new data (e.g., the second dataset)). In other words, here catastrophic forgetting in embodiments may be where the machine learning model 172 is incrementally trained on new data and immediately forgets (e.g., is less performant on) that old dataset (e.g., relative to a previous machine learning model 172) and is performant only on the new data used for training the machine learning model. Thus, in certain embodiments, the machine learning model 172 may be trained on a combination of old data and new data (e.g., data from the first and second datasets) and the resulting incrementally trained model 172 tested on old data (e.g., data from the first dataset 154, 164 used to originally train the model) to see if there is a performance drop (e.g., relative to the previously state of the machine learning model 172 before it was incrementally trained) on the old data. This determination may be done to verify there is no catastrophic forgetting with respect to the machine learning model 172. If it is determined that catastrophic forgetting has occurred incremental machine learning model trainer 132 may incrementally train the machine learning model 172 again using a greater portion of the original dataset 154, 164 in the dataset used to incrementally train the machine learning model 172 (e.g., a combination of the original dataset 154, 164 used to train the machine learning model 712 and data from the second dataset 154, 164). The concept of incremental training may thus be thought of similarly to that of transfer learning in which an existing model (e.g. a neural network model) may be used on a new dataset by removing the final layers of the model, hence creating a new model but still keeping knowledge from the previous one.

The incremental training of machine learning model 172 can be achieved by several techniques. For example, in certain embodiments one method that may be used to incrementally train a model may include modification. In this approach, the weights or decision thresholds within the model may be modified. This can be accomplished by loading an existing model 172 into memory and fitting the model 172 on the second dataset 154, 164, or dataset comprising a combination of the original dataset 154, 164 used to train the machine learning model 172 and data from the second dataset 154, 164. Then incremental model trainer 132 can test the incrementally trained model 172 on both the old data (e.g., first dataset) and the new data (e.g., second dataset or portions of the second dataset different than the first dataset) to check the performance of the resulting model.

Incremental machine learning model trainer 132 may also utilize a model appending or a regeneration approach to incrementally train the machine learning model 172. Here, the machine learning model 172 can be appended with new nodes or trees trained on new data from the second dataset 154, 164. In regeneration, machine learning model trainer 132 may train a new model or a subset of a new model, like some decision trees in case of random forest model, based on data from the second dataset 154, 164. The newly trained model can then be appended to the machine learning model 172, or is used in conjunction with the existing machine learning model 172 to make determinations in an ensemble method.

When appending to the machine learning model 172, the number of instances of the newly trained model can be greater or fewer depending on the changes within the old dataset (e.g., the first dataset 154, 164 used to originally train the machine learning model 172) and new data (e.g., the second dataset 154, 164 determined at a subsequent time) and also the size of both datasets. When working together instead of appending the newly trained model to the existing machine learning model 172, both the existing machine learning model 172 and new model may have different weightage or voting power regarding final prediction on the drift measure based on the amount of data these existing machine learning model 172 and the new model were trained on and represent in the next batch of test data. An example would be that if machine learning model 172 is a random forest model of a number of trees (e.g., 1000) then a new random forest of fewer (e.g., 100) trees can be trained and then both models can be used to make weighted predictions.

Machine learning model trainer 132 may also utilize a replacement technique to incrementally train machine learning model 172 whereby randomly or statically (or otherwise) selected nodes or trees from the machine learning model 172 may be replaced with new nodes or trees trained on new data (e.g., the second dataset 154, 164 determined at a subsequent time). Specifically, a subset or portion of the existing machine learning model 172 (e.g., initially trained on the first dataset 154, 164) is replaced with a new model that is trained on new data (e.g., the second dataset 154, 164 determined at a subsequent time). This replacement may be based on certain thresholds or based on how much new data (e.g., of the second dataset) is available compared to the old dataset (first dataset). For example, in the case of a random forest model of two hundred trees trained on old data, fifty trees can be randomly removed and replaced by new trees which are trained on the new data (e.g., with same schema). This results in a model that can generalize well over both the old and the new dataset.

Additionally, there may be other methods that incremental model trainer 132 can be employed to incrementally train the machine learning model, where which method to use for incremental training may depend on the original machine learning model trained, the availability and size of the new data and whether there is a concept drift between the first dataset on which the model was originally trained and the second (e.g., new) dataset. Again, it will be noted the type of incremental training undertaken may be dependent the type of the machine learning model 172 being incrementally trained.

Once machine learning model 172 is incrementally trained it may be deployed to be utilized in providing the outputs of the artificial intelligence system 150 until such a time as a threshold amount of new data is again obtained from the enterprise 100 or a time period has elapsed or it is otherwise decided to determine if incremental training of the machine learning model 172 should occur. In some embodiments, the drift detection model 174 may also be retrained at this point based on the dataset used to incrementally train the machine learning model 172 (e.g., the second dataset 154, 164, or dataset comprising a combination of the original dataset 154, 164 used to initially train the machine learning model 172 and data from the second dataset 154, 164). In this manner the drift detection model 174 may similarly be updated to effectively detect drift between this incremental training dataset and new data that arrives subsequently to the incremental training of the machine learning model 172.

Figure 4:
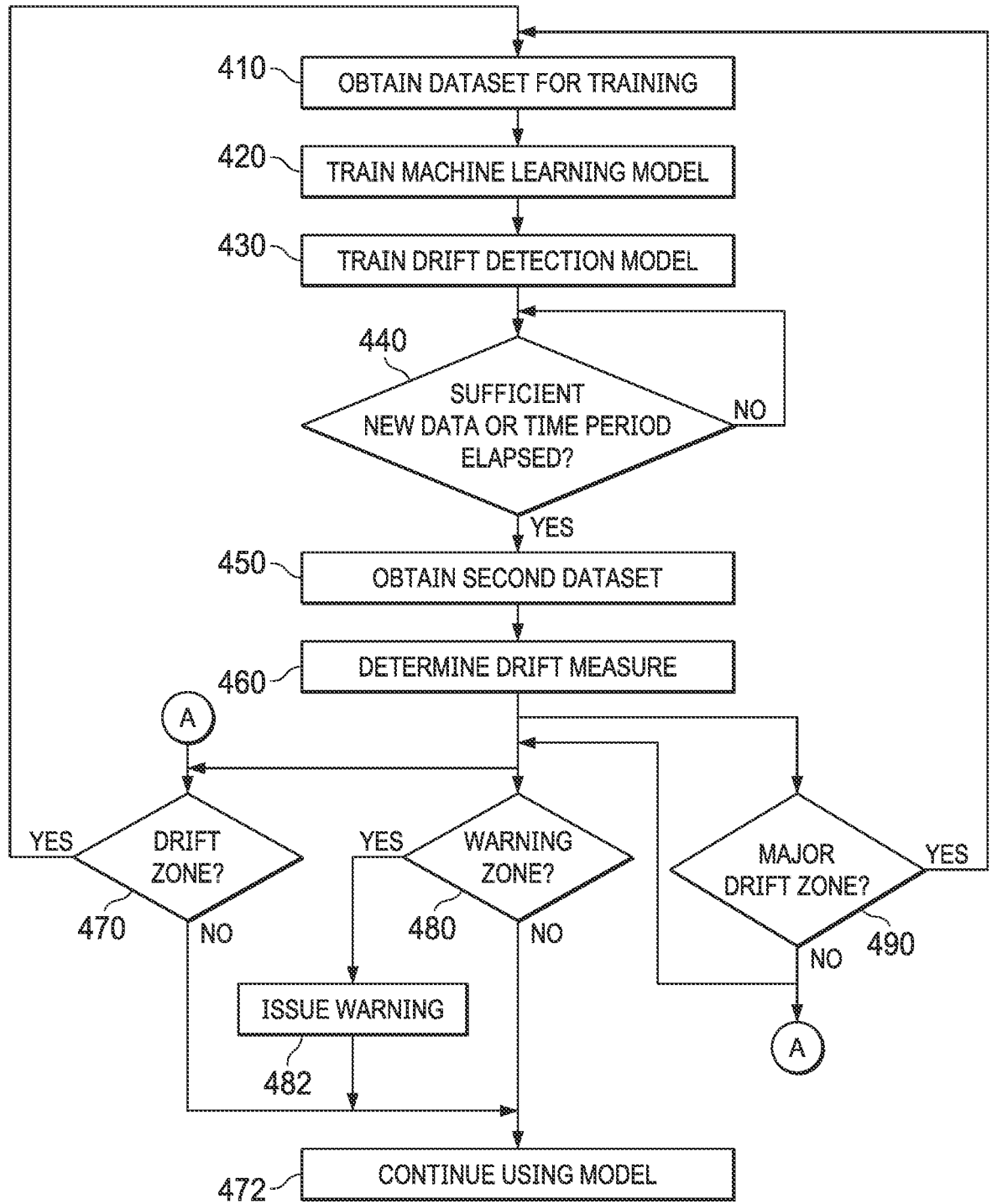
FIG. 4 is a flow diagram of one embodiment of a method for incremental training of a machine learning model.

Looking at FIG. 4 then, one embodiment of a method for incremental training of a machine learning model that may be employed by computing systems is depicted. At some point a dataset may be obtained (STEP 410) and used to train a machine learning model (STEP 420). The machine learning model can then be deployed for use in the computing system. A first dataset may be data obtained, for example, from an enterprise environment or systems used or accessed by an enterprise environment. This first dataset may be processed to determine a machine learning dataset comprising feature values obtained from the first dataset or the first dataset may comprise the machine learning dataset. The machine learning model trained may be almost any type of machine learning model as is known in the art, including for example, regression models, decision tree models, support vector machines (SVM), Naïve Bayes, kNN, K-means, random forest, neural networks, Bayesian networks, etc. It will be noted here that the training of the machine learning model may an incremental training of a previously existing machine learning model trained on another dataset. In such cases, the first dataset may be one of, or a combination of, the datasets that have been evaluated to determine a drift measure that resulted in such an incremental training process. In this manner, the incremental training of a machine learning model based on drift detection may be a substantially continuous process during the deployment of a machine learning model.

The dataset that is used to train the machine learning model (e.g., the first dataset) may then be used to train a drift detection model (STEP 430). This training may, for example, include the determination of one or more metrics associated with the dataset (e.g., the first dataset) that may be used in the determination of drift relative to a second dataset. In this manner, the drift detection model can be tailored specifically to the dataset (e.g., the first dataset) on which the associated machine learning model was trained (or a portion thereof), and thus to the associated machine learning model. Examples of such drift detection models include drift detection models based on a Probably Approximately Correct (PAC) learning model, Adaptive Windowing, Hoeffding's bounds, Kolmogorov-Smirnov windowing, Wasserstein distance, Kullback-Leibler divergence, Jenson-Shannon method, T-test, box plots, histograms, or other types of drift detection models as discussed.

It can then be determined if an incremental training time interval has elapsed, a collection event has occurred from an enterprise, a threshold amount of new data has been received or another incremental training event has occurred, since the machine learning model was trained (STEP 440). If an incremental training event has occurred (Y branch of STEP 440), a second dataset may be obtained (STEP 450). This second dataset may comprise data obtained from the enterprise or may be data obtained from the enterprise (or determined from data obtained from the enterprise) subsequent to a time at which the initial dataset (e.g., the first dataset) used to train the machine learning model was obtained or determined, or comprise other data.

A drift measure between the initial dataset and the second set can then be determined (STEP 460). In particular, the initial dataset (e.g., the first dataset) used to train the machine learning model can be compared against the second (different or subsequent) dataset to determine a drift measure using the drift detection model trained on the initial dataset. This drift measure may comprise a drift indicator such as a numerical indicator, a textual indicator, or some other indictor indicative of a drift or difference between the initial dataset and the second dataset.

Based on the determined drift measure it be determined if an incremental training of the machine learning model is needed or some other action should be taken. For example, the drift measure produced by the application of the drift detection model can be compared to a "drift zone" (STEP 470) such that if the drift measure falls within that drift zone range (or above, or below, that threshold or range, etc.) it can be determined that incremental training of the machine learning model should be undertaken (e.g., the data has drifted significantly enough between the first dataset and the second dataset that incremental training is warranted) (Y branch of STEP 470). Here, the existing machine learning model may be incrementally trained based on newly received data (e.g., or a combination of the newly received dataset and the original initial dataset used to train the machine learning model, etc.). Specifically, a dataset (e.g., a third dataset) may be determined for incrementally training the machine learning model (STEP 410). This third dataset used for incrementally training the machine learning model may be formed of the second dataset or a combination of the initial (e.g., first) and second dataset. The existing machine learning model may then be incrementally trained using this third dataset (STEP 420) and deployed for use in the computing system.

Such incremental training may use the existing machine learning model (e.g., previously trained) as a base and appends new "knowledge" to that existing model (e.g., by changing parameters, features, weights, biases, trees, etc. of that previously trained model). In particular, embodiments may utilize the properties of the machine learning model to train the machine learning model incrementally, retaining the previously learned knowledge and appending to that knowledge as discussed herein. This results in a machine learning model that is updated with the latest data patterns of the newer data and does not suffer from performance loss.

If the drift measure falls below (e.g., or above) the drift zone threshold, it may be determined that no incremental training of the machine learning model is warranted. Thus, it can be determined that the current (e.g., previously trained) machine learning model may continue to be utilized (STEP 472). It can also be determined if the drift measure falls within a warning zone range (or above or below that threshold or range, etc.) (STEP 480). If the drift measure falls within this warning zone (Y branch of STEP 480), a warning action may be taken such as raising a notification or alert to a user associated with the enterprise or the provider of the machine learning artificial intelligence system that a data drift is occurring (STEP 482).

It may also be determined if the drift measure falls within a major drift zone range (or above or below that threshold or range, etc.) (STEP 490). If the drift measure falls within major drift zone range (Y branch of STEP 490) it can be determined that a complete retraining of the machine learning model should be undertaken (e.g., the data of the first dataset and the second dataset are so different that a complete retraining of the machine learning model is needed). Here, a new machine learning model may be trained based on the newly received data (e.g., or a combination of the newly received dataset and the original dataset used to train the machine learning model, etc.). Specifically, a dataset (e.g., a third dataset) may be determined for training a new machine learning model (STEP 410). This third dataset used for training the new machine learning model may be formed of the second dataset or a combination of the initial (e.g., first) and second dataset. A new machine learning model may then be trained using this third dataset (STEP 420) and deployed for use in the computing system.

As noted in various places herein, machine learning may be applied usefully across a large number of computing contexts. One particular context in which machine learning may be usefully applied is in identity management. Examples of such artificial intelligence identity management systems include U.S. patent application Ser. No. 16/861,335 by inventors Badawy et al. filed on Apr. 29, 2020, and entitled "System and Method for Outlier and Anomaly Detection in Identity Management Artificial Intelligence Systems Using Cluster Based Analysis of Network Identity Graphs"; U.S. Pat. No. 10,681,056 by inventors Badawy et al. issued Jun. 9, 2020 and entitled "System and Method for Outlier and Anomaly Detection in Identity Management Artificial Intelligence Systems Using Cluster Based Analysis of Network Identity Graphs"; U.S. patent application Ser. No. 16/998,702 by inventors Badawy et al. filed on Aug. 20, 2020, and entitled "System and Method for Peer Group Detection, Visualization and Analysis In Identity Management Artificial Intelligence Systems Using Cluster Based Analysis of Network Identity Graphs"; U.S. Pat. No. 10,341,430 by inventors Badawy et al. issued Jul. 2, 2019 and entitled "System and Method for Peer Group Detection, Visualization and Analysis In Identity Management Artificial Intelligence Systems Using Cluster Based Analysis of Network Identity Graphs"; U.S. Pat. No. 10,476,952 by inventors Badawy et al. issued Nov. 12, 2019 and entitled "System and Method for Peer Group Detection, Visualization and Analysis In Identity Management Artificial Intelligence Systems Using Cluster Based Analysis of Network Identity Graphs"; U.S. Pat. No. 10,476,953 by inventors Badawy et al. issued Nov. 12, 2019 and entitled "System and Method for Peer Group Detection, Visualization and Analysis In Identity Management Artificial Intelligence Systems Using Cluster Based Analysis of Network Identity Graphs"; U.S. Pat. No. 10,791,170 by inventors Badawy et al. issued Sep. 29, 2020 and entitled "System and Method for Peer Group Detection, Visualization and Analysis In Identity Management Artificial Intelligence Systems Using Cluster Based Analysis of Network Identity Graphs"; U.S. patent application Ser. No. 16/582,862 by inventors Badawy et al. filed on Sep. 25, 2019, and entitled "System and Method for Intelligent Agents for Decision Support in Network Identity Graph Based Identity Management Artificial Intelligence Systems"; U.S. Pat. No. 10,523,682 by inventors Badawy et al. issued Dec. 31, 2019, and entitled "System and Method for Intelligent Agents for Decision Support in Network Identity Graph Based Identity Management Artificial Intelligence Systems"; U.S. patent application Ser. No. 17/101,406 by inventors Badawy et al. filed on Nov. 23, 2020, and entitled "System and Method for Predictive Modeling for Entitlement Diffusion and role Evolution in Identity Management Artificial Intelligence Systems Using Network Identity Graphs"; U.S. patent application Ser. No. 16/998,719 by inventors Badawy et al. filed on Aug. 20, 2020 and entitled "System and Method for Role Mining In Identity Management Artificial Intelligence Systems Using Cluster Based Analysis of Network Identity Graphs"; U.S. Pat. No. 10,554,665 by inventors Badawy et al. issued Feb. 4, 2020, and entitled "System and Method for Role Mining In Identity Management Artificial Intelligence Systems Using Cluster Based Analysis of Network Identity Graphs"; U.S. Pat. No. 10,848,499 by inventors Badawy et al. issued Nov. 24, 2020, and entitled "System and Method for Role Mining In Identity Management Artificial Intelligence Systems Using Cluster Based Analysis of Network Identity Graphs"; U.S. patent application Ser. No. 16/814,291 by inventors Badawy et al. filed on Mar. 10, 2020, and entitled "Systems and Methods for Data Correlation and Artifact Matching in Identity Management Artificial Intelligence Systems"; U.S. patent application Ser. No. 17/024,560 by inventors Badawy et al. filed on Sep. 17, 2020, and entitled "System and Method for Predictive Platforms in Identity Management Artificial Intelligence Systems Using Analysis of Network Identity Graphs"; U.S. patent application Ser. No. 17/039,594 by inventors Badawy et al. filed on Sep. 30, 2020, and entitled "System and Method for Role Validation in Identity Management Artificial Intelligence Systems Using Analysis of Network Identity Graphs"; and U.S. Pat. No. 10,862,928 by inventors Badawy et al. issued Dec. 8, 2020, and entitled "System and Method for Role Validation in Identity Management Artificial Intelligence Systems Using Analysis of Network Identity Graphs", all of which are incorporated herein by reference in their entirety for all purposes.

Figure 5:
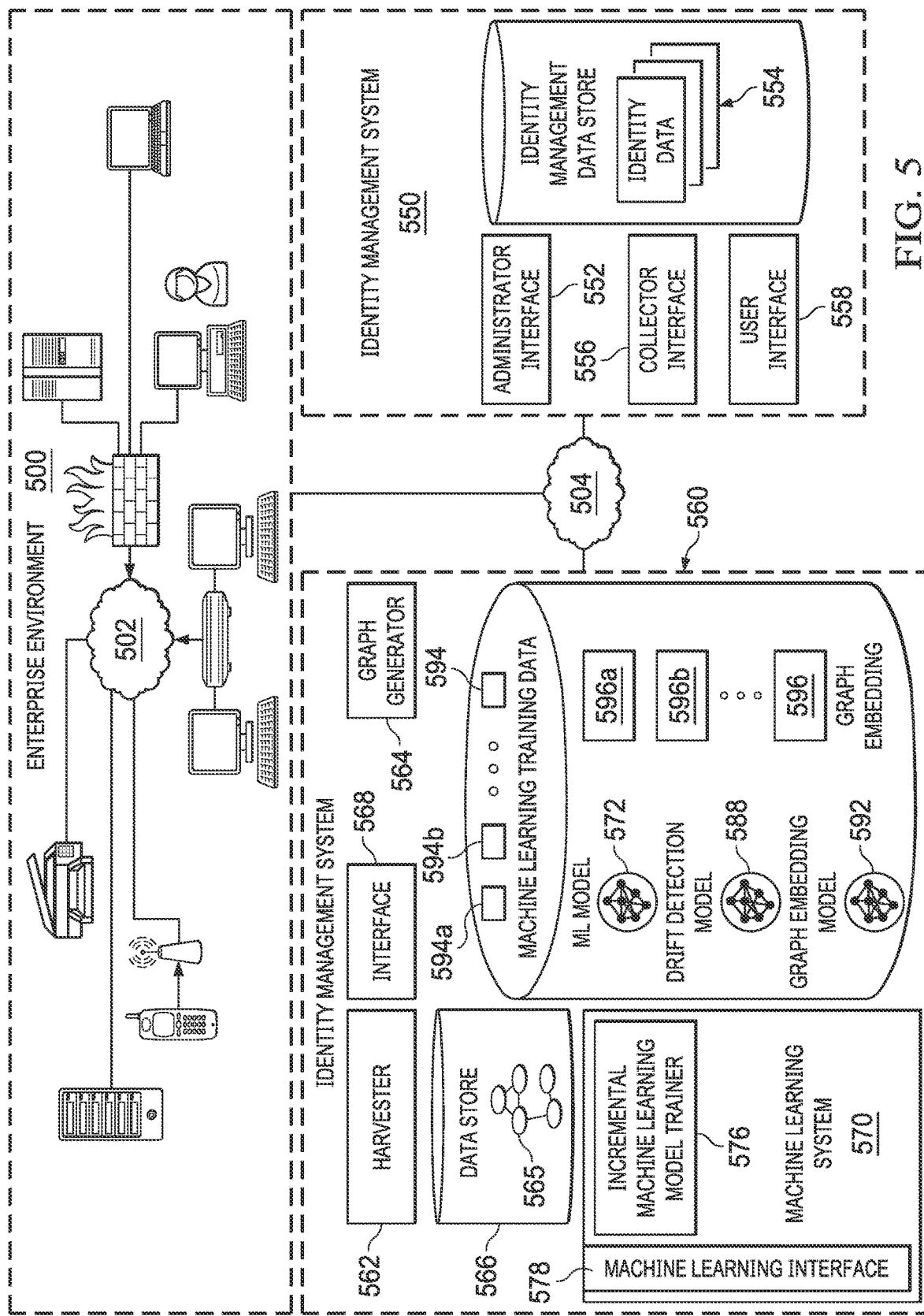
FIG. 5 is a block diagram of a distributed networked computer environment including one embodiment of an identity management system adapted for incremental training.

Accordingly, embodiments of the incremental training of machine learning models as disclosed herein may be usefully applied in such artificial intelligence identity management contexts. To illustrate, FIG. 5 depicts a distributed networked computer environment including one embodiment of an identity management system that utilizes a machine learning model and the incremental training of such a machine learning model. Here, the networked computer environment may include an enterprise computing environment 500. Enterprise environment 500 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 500 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 500. Users can include employees, supervisors, managers, IT personnel, vendors, suppliers, customers, robotic or application based users, etc. associated with enterprise 500.

Users may access resources of the enterprise environment 500 to perform functions associated with their jobs, obtain information about enterprise 500 and its products, services, and resources, enter or manipulate information regarding the same, monitor activity in enterprise 500, order supplies and services for enterprise 500, manage inventory, generate financial analyses and reports, or generally to perform any task, activity or process related to the enterprise 500. Thus, to accomplish their responsibilities, users may have entitlements to access resources of the enterprise environment 500. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 500 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 500 which may shift, change, evolve, etc. leaving entitlements non optimally distributed among various users.

To assist in managing the entitlements assigned to various users and more generally in managing and assessing access risks in enterprise environment 500, an identity management system 550 may be employed. Such an identity management system 550 may allow an administrative or other type of user to define one or more identities, one or more entitlements, or one or more roles, and associate defined identities with entitlements using, for example, an administrator interface 552. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 550 has been depicted in the diagram as separate and distinct from the enterprise environment 500 and coupled to enterprise environment 500 over a computer network 504 (which may be the same as, or different than, network 502), it will be realized that such an identity management system 550 may be deployed as part of the enterprise environment 500, remotely from the enterprise environment, as a cloud based application or set of services, or in another configuration.

An identity may thus be almost physical or virtual thing, place, person or other item that an enterprise would like to define. For example, an identity may be a capacity, groups, processes, physical locations, individual users or humans or almost any other physical or virtual entity, place, person or other item. An entitlement may be an item (e.g., token) that upon granting to a user will allow the user to acquire a certain account or privileged access level that enables the user to perform a certain function within the distributed networked enterprise computer environment 500. Thought of another way, an entitlement may be a specific permission granted within a computer system, such as access to a particular building (based on a user's key badge), access to files and folders, or access to certain parts of websites. Entitlements may also define the actions a user can take against the items they have access to, including, for example, accessing computing systems, applications, file systems, particular data or data items, networks, subnetworks or network locations, etc. Each of these identities may therefore be assigned zero or more entitlements with respect to the distributed networked computer environments.

To facilitate the assignment of these entitlements, enterprises may also be provided with the ability to define roles through the identity management system 550. A role within the context of the identity management system 550 may be a collection of entitlements. These roles may be assigned a name or identifiers (e.g., manager, engineer level 2, team leader) by an enterprise that designate the type of user or identity that should be assigned such a role. By assigning a role to an identity using the identity management system 550, the identity may be assigned the corresponding collection of entitlements associated with the assigned role.

The identity management system 550 may thus store identity management data 554. The identity management data 554 stored may include a set of entries, each entry corresponding to and including an identity (e.g., alphanumerical identifiers for identities) as defined and managed by the identity management system, a list or vector of entitlements or roles assigned to that identity by the identity management system, and a time stamp at which the identity management data was collected from the identity management system. Other data could also be associated with each identity, including data that may be provided from other systems such as a title, location or department associated with the identity. The set of entries may also include entries corresponding to roles, where each entry for a role may include the role identifier (e.g., alphanumerical identifier or name for the role) and a list or vector of the entitlements associated with each role. Other data could also be associated with each role, such as a title, location or department associated with the role.

Collectors 556 of the identity management system 550 may thus request or otherwise obtain data from various touchpoint systems within enterprise environment 500. These touchpoint systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite. This collection process may be obtained, for example, as part of a regular collection or harvesting process performed at some regular interval by connecting to, and requesting the identity management data from, the enterprise 500. Accordingly, the collectors 556 of the identity management system 550 may obtain or collect event data from various systems within the enterprise environment 500 and process the event data to associate the event data with the identities defined in the identity management data 554 to evaluate or analyze these events or other data in an identity management context. A user may interact with the identity management system 550 through a user interface 558 to access or manipulate data on identities, roles, entitlements, events or generally perform identity management with respect to enterprise environment 500.

As part of a robust identity management system, it may be desirable to analyze the identity management data 554 associated with an enterprise 500. For example, it may be desirable to group or cluster the identities or entitlements of an enterprise 500 into peer groups such that, for example, the identities in a peer group are similar with respect to the set of entitlements assigned to the identities of that group (e.g., relative to other identities or other groups) or, to determine peer groups of entitlements such that entitlement patterns and assignment may be determined and role mining performed. Peer grouping of the identities within an enterprise (or viewing the peer groups of identities) may allow, for example, an auditor or other person performing a compliance analysis or evaluation to quantitatively and qualitatively assess the effectiveness of any applicable pre-existing policies, or lack thereof, and how strictly they are enforced. Similarly, peer grouping of entitlements may allow roles to be determined from such entitlement groups and outlier entitlements to be identified. This information may, in turn, be utilized to redefine or govern existing roles as defined in the identity management system 550 and allow users of the identity management system 550 greater visibility into the roles of the enterprise 500.

Accordingly, to assist in analysis of identity management data 554 (e.g., for peer grouping or otherwise) an identity management system 560 (which may be combined with, or included in identity management system 550 or which may be separate system) may include a harvester 562 and a graph generator 564. The harvester 562 may obtain identity management data 554 from one or more identity management systems 550 associated with enterprise 500. The identity management data may be obtained, for example, as part of a regular collection or harvesting process performed at some regular interval by connecting to, and requesting the identity management data from, the identity management system 550. The identity management data stored may thus include a set of entries, each entry corresponding to and including an identity as defined and managed by the identity management system, a list or vector of entitlements or roles assigned to that identity by the identity management system, and a time stamp at which the identity management data was collected from the identity management system 550. The identity management data may also include a set of entries for roles, each entry corresponding to and including a role as defined and managed by the identity management system 550 and a list or vector of entitlements assigned to that role by the identity management system 550, and a time stamp at which that identity management data was collected from the identity management system 550.

As will be understood, the gathering of identity management data and determination of peer groups can be implemented on a regular, semi-regular or repeated basis, and thus may be implemented dynamically in time. Accordingly, as the data is obtained, it may be stored as a time-stamped snapshot. The identity management data stored may thus include a set of entries, each entry corresponding to and including an identity (e.g., alphanumerical identifiers for identities) as defined and managed by the identity management system, a list or vector of entitlements assigned to that identity by the identity management system, and a time stamp at which the identity management data was collected from the identity management system. Other data could also be associated with each identity, including data that may be provided from an identity management system such as a title, location or department associated with the identity. The collection of entries or identities associated with the same times stamp can thus be thought of as a snapshot from that time of the identities and entitlements of the enterprise computing environment as management by the identity management system.

As an example of identity management data that may be obtained from an identity management system, the following is one example of a JavaScript Object Notation (JSON) object that may relate to an identity:

```
{
    "attributes": {
        "Department": "Finance",
        "costcenter": "[R01e, L03]",
        "displayName": "Catherine Simmons",
        "email": "Catherine.Simmons@demoexample.com",
        "empId": "1b2c3d",
        "firstname": "Catherine",
        "inactive": "false",
        "jobtitle": "Treasury Analyst",
        "lastname": "Simmons",
        "location": "London",
        "manager": "Amanda.Ross",
        "region": "Europe",
        "riskScore": 528,
        "startDate": "12/31/2016 00:00:00AM UTC",
        "nativeIdentity_source_2": "source_2",
        "awesome_attribute_source_1": "source_1",
        "twin_attribute_a" : "twin a",
        "twin_attribute_b" : "twin b",
        "twin_attribute_c" : "twin c"
    },
    "id": "2c9084ee5a8de328015a8de370100082",
    "integration_id": "iiq",
    "customer_id": "ida-bali",
    "meta": {
        "created": "2017-03-02T07:19:37.233Z",
        "modified": "2017-03-02T07:24:12.024Z"
    },
    "name": "Catherine.Simmons",
    "refs": {
        "accounts": {
            "id": [
                "2c9084ee5a8de328015a8de370110083"
            ],
            "type": "account"
        },
        "entitlements": {
            "id": [
                "2c9084ee5a8de328015a8de449060e54",
                "2c9084ee5a8de328015a8de449060e55"
            ],
            "type": "entitlement"
        },
        "manager": {
            "id": [
                "2c9084ee5a8de022015a8de0c52b031d"
            ],
            "type": "identity"
        }
    },
    "type": "identity"
}
```

As another example of identity management data that may be obtained from an identity management system, the following is one example of a JSON object that may relate to an entitlement:

```
{
    "integration_id": "bd992e37-bbe7-45ae-bbbf-c97a59194cbc",
```

-continued

```
"refs": {
  "application": {
    "id": [
      "2c948083616ca13a01616ca1d4aa0301"
    ],
    "type": "application"
  }
},
"meta": {
  "created": "2018-02-06T19:40:08.005Z",
  "modified": "2018-02-06T19:40:08.018Z"
},
"name": "Domain Administrators",
"attributes": {
  "description": "Domain Administrators group on Active Directory",
  "attribute": "memberOf",
  "aggregated": true,
  "requestable": true,
  "type": "group",
  "value": "cn=Domain Administrators,dc=domain,dc=local"
},
"id": "2c948083616ca13a01616ca1f1c50377",
"type": "entitlement",
"customer_id": "3a60b474-4f43-4523-83d1-eb0fd571828f"
}
```

As another example of identity management data that may be obtained from an identity management system, the following is one example of a JSON object that may relate to a role:

```
{
"id": "id",
"name": "name",
"description":
"description",
"modified": "2018-09-
07T17:49:33.667Z", "created":
"2018-09-07T17:49:33.667Z",
"enabled": true,
"requestable": true,
"tags": [
    {
        "id": "2c9084ee5a8ad545345345a8de370110083"
            "name" : "SOD-SOX",
            "type": "TAG"
        },
    {
        "id": "2c9084ee5a8ad545345345a8de370122093"
            "name" : "PrivilegedAccess",
            "type": "TAG"
        },
],
"accessProfiles":
[
    {
            "id": "accessProfileId",
        "name": "accessProfileName"
    }
],
"accessProfileCount":
1, "owner": {
"name": "displayName",
"id": "ownerId"
},
"synced": "2018-09-07T17:49:33.667Z"
}
```

Graph generator 564 may generate an identity graph 565 from the obtained identity management data. Specifically, in one embodiment, a property (identity) graph may be generated from the identity management data 554 obtained from the enterprise. Each of the identities and entitlements from the most recently obtained identity management data may be determined and a node of the graph created for each identity and entitlement. An edge is constructed between every pair of nodes (e.g., identities) that shares at least one entitlement and between every pair of nodes (e.g., entitlements) that shares at least one identity. Each edge of the graph may also be associated with a similarity weight representing a degree of similarity between the identities of the respective nodes joined by that edge, or between the entitlements of the respective nodes joined by that edge. It will be noted here that while a similarity weight may be utilized on edges between both identity nodes and entitlement nodes, the similarity weight type, determination and value may be determined differently based upon the respective type of node(s) being joined that weighted edge.

Specifically, each of the identities and entitlements from the most recent snapshot of identity management data may be obtained and a node of the graph created for each identity and entitlement. An edge is constructed between every pair of identity nodes (e.g., identities) that shares at least one entitlement (e.g., an edge connects two identity nodes if and only if they have at least one entitlement in common). An edge may also be constructed between every pair of entitlement nodes (e.g., entitlements) that shares at least one identity (e.g., an edge connects two entitlement nodes if and only if they have at least one identity in common).

Each edge of the graph joining identity nodes or entitlement nodes may be associated with a similarity weight representing a degree of similarity between the identities or entitlements of the respective nodes joined by that edge. For identity nodes, the similarity weight of an edge joining the two identity nodes may be generated based on the number of entitlements shared between the two joined nodes. As but one example, the similarity weight could be based on a count of the similarity (e.g., overlap or intersection of entitlements) between the two identities divided by the union of entitlements. Similarly, for identity nodes, the similarity weight of an edge joining the two entitlement nodes may be generated based on the number of identities shared between the two joined nodes. As but one example, the similarity weight could be based on a count of the similarity (e.g., overlap or intersection of identities) between the two entitlements divided by the union of identities. For instance, the similarity could be defined as the ratio between a number of identities having both entitlements joined by the edge to the number of identities that have either one (e.g., including both) of the two entitlements.

In one embodiment, the edges are weighted via a proper similarity function (e.g., Jaccard similarity). In one embodiment, a dissimilarity measure, of entitlement or identity binary vectors, d, may be chosen, then the induced similarity, $1-d(x,y)$, may be used to assign a similarity weight to the edge joining the nodes, x,y. Other methods for determining a similarity weight between two nodes are possible and are fully contemplated herein. Moreover, it will be noted here that while a similarity weight may be utilized on edges between both identity nodes and entitlement nodes, the similarity weight type, determination and value may be determined differently based upon the respective type of node(s) being joined that weighted edge.

In one specific, embodiment, a symmetric matrix for identities (e.g., an identity adjacency matrix) may be determined with each of the identities along each axis of the matrix. The diagonal of the matrix may be all 0s while the rest of values are the similarity weights determined between the two (identity) nodes on the axes corresponding to the value. In this manner, this symmetric matrix may be provided to a graph constructor which translates the identities on the axes and the similarity values of the matrix into graph store commands to construct the identity graph. Similarly, a symmetric matrix for entitlements (e.g., an entitlement adjacency matrix) may be determined with each of the entitlements along each axis of the matrix. The diagonal of the matrix may be all 0s while the rest of values are the similarity weights determined between the two (entitlement) nodes on the axes corresponding to the value. In this manner, this symmetric matrix may be provided to a graph constructor which translates the entitlement on the axes and the similarity values of the matrix into graph store commands to construct the identity graph.

Accordingly, the identity management data may be faithfully represented by a graph, with k types of entities (nodes/vertices, e.g., identity-id, title, location, entitlement, etc.) and stored in a graph data store. It will be noted that graph data store may be stored in any suitable format and according to any suitable storage, including, for example, a graph store such a Neo4j, a triple store, a relational database, etc. Access and queries to this graph data store may thus be accomplished using an associated access or query language (e.g., such as Cypher in the case where the Neo4j graph store is utilized).

As such, the obtained identity management data 554 of an enterprise 500 may be represented by an identity graph 565 and stored in graph data store 566. It will be noted here, that while identities and entitlements are discussed herein as examples of identity management artifacts that are represented as nodes in the graph, as discussed above, other identity management artifacts (e.g., roles, groups, etc.) may also be represented as nodes in the identity graph.

An interface 568 of the identity management system 560 may use the identity graph 565 in the graph data store 566 to present one or more interfaces which may be used for risk assessment or other uses, as will be discussed. For example, an interface 568 may present a visual representation of the graph, the identities, entitlements, or the peer groups in the identity graph to a user of the identity management system 560 associated with enterprise 500 to assist in compliance or certification assessments or evaluation of the identities, entitlements or roles as currently used by the enterprise (e.g., as represented in identity management data 554 of identity management system 550).

The interface 568 may also offer an interface by which computing systems of the enterprise 500 or users of the enterprise (or other users) may obtain outputs (e.g., data, recommendations, actions, alerts, actions, notifications, etc.). To provide such outputs then, the identity management system 560 may employ a machine learning system 570 that trains, tests or utilizes one or more machine learning models 572. This machine learning model 572 may be trained or tested based on data produced or otherwise associated with the enterprise environment 500. Accordingly, at some time interval, (e.g., when identity management data 554 is obtained from identity management system 550 or identity management graph 565 is updated based on such identity management data 554), identity management system 560 may determine an associated dataset of machine learning training data 594. Machine learning model trainer 574 can then utilize an enterprise dataset 554 or machine learning training dataset 594 to train machine learning model 572. This machine learning model 572 can then be used by identity management system 560 in the generation of outputs. In particular, the machine learning model 572 can be accessed through machine learning interface 578 to, for example, obtain predictions, classifications or other output from the machine learning model 572 for use in generating output by the identity management system 560.

In many cases, at least some of the machine learning training set 594 may comprise data or features determined from the identity graph 565. As has been noted, this identity graph 565 may be updated on a substantially regular basis based on new or updated data received from the enterprise 500 in identity management data 554. Thus, it can be desirable to incrementally train the machine learning model 572 when the identity graph 565 drifts from a previous version of the identity graph 565 utilized in the training of machine learning model 572 (e.g., a previous version of identity graph 565 from which training data 594 (e.g., 594a, 594b) used to train the machine leaning model 572 at a previous time was derived).

Accordingly, machine learning system 570 may include incremental machine learning model trainer 576. Incremental model trainer 576 may serve to determine when machine learning model 572 should be incrementally trained and then incrementally train the machine learning model 572 when it is determined that the machine learning model 572 should be incrementally trained. Here, the determination of when incremental training of machine learning model 572 should be undertaken by incremental model trainer 576 may be driven by a drift measure determined by the evaluation of datasets derived from or representing identity graph 565 at two different points in time, including a dataset for the identity graph 565 from a first time where data from that identity graph 565 was used to derive data to train the machine learning model 572 and a dataset from a subsequent (or otherwise different) version of the identity graph 565 updated subsequently to the training (or deployment) of the machine learning model 572 (or which is otherwise different from the initial identity graph 565). Such a determination may be undertaken at a certain time interval, when a threshold amount of new data is determined, when the identity graph 565 is updated, or some other basis). This drift measure may comprise a drift indicator such as a numerical indicator, a textual indicator, or some other indictor indicative of a drift or difference between the first dataset representing (or derived from) the identity graph 565 at a first time and the second dataset representing (or derived from) the identity graph 565 at a second (e.g., subsequent time). Based on the determined drift measure incremental model trainer 576 can determine if an incremental training of the machine learning model 572 is warranted.

The drift detection measure may be produced by the application of drift detection model 588 to the first and second dataset representing the identity graph 565 at the two different points in time. Thus, to determine such a drift measure, the incremental model trainer 576 may apply drift detection model 574 to at least one of the datasets representing the identity graph 565 for which it is desired to determine the drift measure. In one embodiment, the drift detection model 588 may be trained or otherwise determined based on the first dataset representing the identity graph 565 at the first point in time. In this manner, the drift detection model 588 can be tailored specifically to the first dataset on which the associated machine learning model 572 was trained (or a portion thereof), and thus to the associated machine learning model 572. Examples of such drift detection models include drift detection models based on a Probably, Approximately Correct (PAC) learning model, Adaptive Windowing, Hoeffding's bounds, Kolmogorov-Smirnov windowing, Wasserstein distance, Kullback-Leibler divergence, Jenson-Shannon method, T-test, box plots, histograms, or other types of drift detection models.

It will be noted that in many cases such drift detection models 588 may be more useful with, or confined to, numerical data. However, in certain instances of identity management systems a dataset used to train a machine learning model may be categorical data, or derived from categorical data, obtained or determined from an enterprise with which the identity management system is deployed or represented in identity graph 565. A categorical variable is a variable that can take on one of a limited, and usually fixed, number of possible values, assigning each individual or other unit of observation to a particular group or nominal category on the basis of some qualitative property. This data may include, for example, identities and identity attributes, role attributes, entitlements, relationships, or categorical data on other identity management artifacts. Such identity management data can be represented, for example, in an identity graph 565.

As the identity management data 554 of the enterprise 500 changes the identity graph 565 representing such identity management data may likewise change. For these types of artificial intelligence identity management systems 560 then, in many cases machine learning models 588 may be trained on these identity graphs 565 or features or attributes in machine learning dataset 594 derived from such graphs. As such, if the patterns represented in the identity graph 565 change (e.g., because of new data being represented) the performance of the machine learning models 572 trained based on these identity graphs may suffer, as discussed above. Thus, the datasets which it may be desired to compare with a drift detection model 588 in such identity management systems 560 may be the identity graph 565 itself (or features, aspect, attributes, or subgraphs of these identity graphs) from two different points in time. It may be difficult if not impossible (e.g., given time or computing resource constraints) to utilize drift detection models that compare large graphs directly due to, for example, the exponential nature of node and edge companions.

As mentioned above, however, many drift detection models may be more performant (or simpler to implement) on numerical data. Thus, such drift detection models may not be effectively utilized with categorical data or these types of identity graphs 565. Therefore, in some embodiments, to implement drift detection with respect to identity graph 565, graph embeddings may be utilized. A graph embedding model 592 may be used to transform the nodes, edges or features of identity graph 565 into a (e.g., lower dimension) vector representing the nodes or edges of the graph (or portion thereof) embedded. By utilizing graph embedding models 592 that are trained on identity management graph 565, this graph embedding model 592 can be used on new or different graphs (e.g., when an underlying attribute schema remains the same). These embeddings 596, which are a vector of numerical features, can then be used to detect drifts in the categorical features by applying the drift detection model 588 to comparing a dataset comprising an embedding 596a of a previous instance of graph 565 (e.g., when the machine learning model 572 was trained) to a dataset comprising an embedding 596b representing a current instance of the identity graph 565.

Thus, when machine learning system 570 trains machine learning model 572 using machine learning dataset 594 derived from the identity graph 565 it may generate a first graph embedding 596a representing the identity graph 565 (e.g., at the first time). Subsequently, when it is desired to determine if incremental training of the machine learning model 572 should be undertaken, a second graph embedding 596b for a second identity graph 565 representing a second dataset (e.g., from a subsequent time or otherwise different from the first dataset) may be generated. A drift detection model 588 may be applied to the first and second graph embeddings 596a, 596b (e.g., the graph embeddings may be comprised in the first and second dataset to which the drift detection model 588 may be applied) to determine a drift measure between the first and second identity graphs (e.g., the identity graph 565 from two different points in time) from which the embeddings 596a, 596b were generated.

In fact, in certain embodiments the same drift detection model algorithm that may be applied to numerical data (e.g., other datasets in the identity management system) may be applied to detect drift in the identity graph 565 utilized by the system. Moreover, by utilizing these graph embeddings changes in various specific aspects represented in the identity graphs 565 may be detected. For example, certain nodes or edges of the graph may be associated with identities, entitlements or roles. Certain relationships or edges of the graph may be associated with connection weights between the nodes representing theses identity management artifacts (e.g., identities, roles, entitlements, etc.). By scoping the graph 565 to certain nodes or edges and embedding only these scoped nodes or edges of the identity graphs, the application of a drift detection model 588 to the embeddings of a first identity graph and a second identity graph may be able to detect drift in particular identity management artifacts (e.g., identities, roles, entitlements, etc.) or relationships between those identity management artifacts. For example, drift detection may be used to detect drift in the identities or roles represented by two identity graphs or detect drift in the relationships between identities or roles, or roles and identities, etc.

At the point where it is determined that incremental training of the machine learning model is warranted (e.g., the drift measure produced by the drift detection model for the first and second data set is within the drift zone range), the machine learning system 570 may undertake such incremental training of the machine learning model 572 as discussed.

It may now be helpful to look at such visual depictions and presentations of identity graphs (e.g., graphs from which embeddings may be created to determine drift between versions of such graphs). It will be apparent that these depictions and interfaces are but example of depictions that may presented or utilized, and that almost any type of presentation, depiction or interface based on the identities, entitlements, peer groups or other associated data discussed may be utilized in association with the embodiments of identity management systems disclosed herein.

As discussed, embodiments of the identity management systems as disclosed may create, maintain or utilize identity graphs. These identity graphs may include a graph comprised of nodes and edges, where the nodes may include identity management nodes representing, for example, an identity, entitlement or peer group, and the edges may include relationships between these identity management nodes. The relationships represented by the edges of the identity graph may be assigned weights or scores indicating a degree of similarity between the nodes related by a relationship, including, for example, the similarity between two nodes representing an identity or two nodes representing an entitlement, as discussed. Additionally, the relationships may be directional, such that they may be traversed only in a single direction, or have different weightings depending on the direction in which the relationship is traversed or the nodes related. Embodiments of such an identity graph can thus be searched (or navigated) to determine data associated with one or more nodes. Moreover, the similarity between, for example, the identities or entitlements may be determined using the weights of the relationships in the identity graph.

Specifically, in certain embodiments, a property graph may be thought of as a graph comprising a number of interrelated nodes. These nodes may include nodes that may have labels defining the type of the node (e.g., the type of "thing" or entity that the node represents, such as an identity, entitlement or peer group) and properties that define the attributes or data of that node. For example, the labels of the nodes of an identity graph may include "Identity", "Entitlement" or "PeerGroup". Properties of a node may include, "id", "company", "dept", "title", "location", "source" "size", "clique", "mean_similarity", or the like.

The nodes of the property graph may be interrelated using relationships that form the edges of the graph. A relationship may connect two nodes in a directional manner. These relationships may also have a label that defines the type of relationship and properties that define the attributes or data of that relationship. These properties may include an identification of the nodes related by the relationship, an identification of the directionality of the relationship or a weight or degree of affinity for the relationship between the two nodes. For example, the labels of the relationships of an identity graph may include "Similarity" or "SIM", "Has_Entitlement" or "HAS_ENT", "Belongs_To_PeerGroup" or "BELONGS_TO_PG", or the like.

Figure 6A:
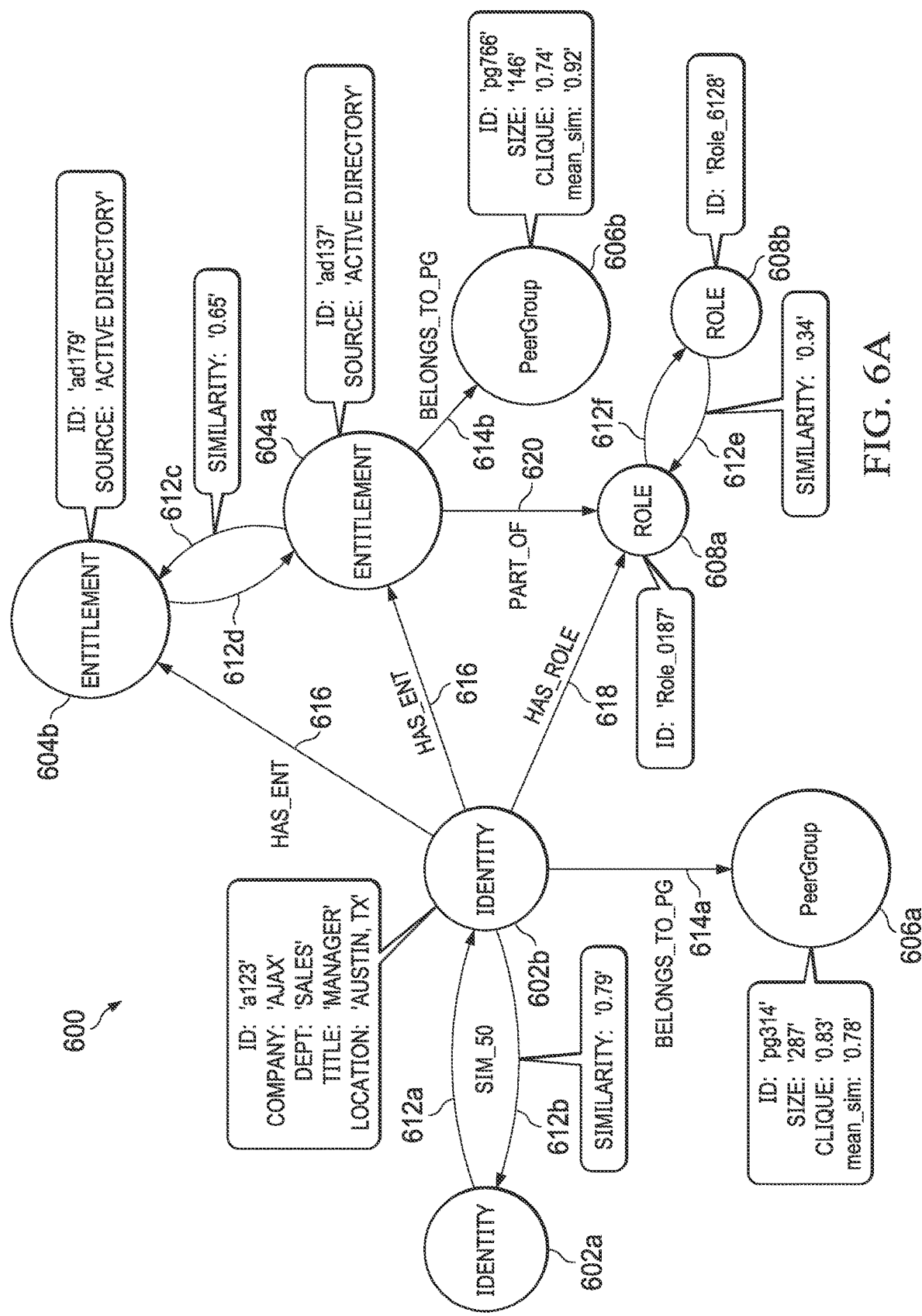
FIGS. 6A, 6B, 6C and 6D depict example visual representations of identity graphs.

Referring then to FIG. 6A, a graphical depiction of a portion of an example identity graph 600 is depicted. Here, nodes are represented by circles and relationships are represented by the directional arrows between the nodes. Such an identity graph 600 may represent identities, entitlements or peer groups, their association, and the degree of similarity between identities represented by the nodes. Thus, for example, the identity nodes 602a, 602b have the label "Identity" indicating they are identity nodes. Identity node 602b is shown as being associated with a set of properties that define the attributes or data of that identity node 602b, including here that the "id" of identity node 602b is "a123", the "company" of identity node 602b is "Ajax", the "dept" of identity node 602b is "Sales", the "title" of identity node 602b is "Manager", and the "location" of identity node 602b is "Austin, TX".

These identity nodes 602 of the identity graph 600 are joined by edges formed by directed relationships 612a, 612b. Directed relationship 612a may represent that the identity of identity node 602a is similar to (represented by the labeled "SIM" relationship 612a) the identity represented by identity node 602b. Similarly, directed relationship 612b may represent that the identity of identity node 602b is similar to (represented by the labeled "SIM" relationship 612b) the identity represented by identity node 602a. Here, relationship 612b has been assigned a similarity weight of 0.79. Notice that while these relationships 612a, 612b are depicted as individual directional relationships, such a similar relationship may be a single bidirectional relationship assigned a single similarity weight.

Entitlement nodes 604a, 604b have the label "Entitlement" indicating that they are entitlement nodes. Entitlement node 604a is shown as being associated with a set of properties that define the attributes or data of that entitlement node 604a, including here that the "id" of entitlement node 604 is "ad137", and the "source" of entitlement node 604a is "Active Directory". Entitlement node 604b is shown as being associated with a set of properties that define the attributes or data of that entitlement node 604b, including here that the "id" of entitlement node 604b is "ad179", and the "source" of entitlement node 604b is "Active Directory".

These entitlement nodes 604 of the identity graph 600 are joined by edges formed by directed relationships 612c, 612d. Directed relationship 612c may represent that the entitlement node 604a is similar to (represented by the labeled "SIM" relationship 612c) the entitlement represented by entitlement node 604b. Similarly, directed relationship 612d may represent that the entitlement of entitlement node 604b is similar to (represented by the labeled "SIM" relationship 612d) the entitlement represented by entitlement node 604a. Here, relationship 612c has been assigned a similarity weight of 0.65. Notice that while these relationships 612c, 612d are depicted as individual directional relationships, such a similar relationship may be a single bidirectional relationship assigned a single similarity weight.

Identity node 602b and entitlement nodes 604a, 604b of the identity graph 600 are joined by edges formed by directed relationships 616. Directed relationships 616 may represent that the identity of identity node 602b has (represented by the labeled "HAS_ENT" relationships 616) the entitlements represented by entitlement nodes 604a, 604b.

Peer group node 606a has the label "PeerGroup" indicating that it is a peer group node. Peer group node 606a is shown as being associated with a set of properties that define the attributes or data of that peer group node 606a, including here that the "id" of peer group node 606a is "pg314", the "size" of peer group node 606a is "287", the "clique" of peer group node 606a is "0.83" and the "mean_sim" or mean similarity value of peer group node 606a is "0.78". Here, the "clique" attribute may refer to a cluster density metric for that peer group represented by that peer group node. The cluster density metric may be defined, for example, defined as the ratio between the number of actual edges within a graph cluster to the maximum possible number of edges with the same number of nodes within the cluster. The latter number is known, in terms of the number of nodes N, and may equal $N*(N-1)/2$.

Identity node 602b and peer group node 606a of the identity graph 600 are joined by an edge formed by directed relationship 614a. Directed relationship 614a may represent that the identity of identity node 602b belongs to (represented by the labeled "BELONGS_TO_PG" relationship 614a) the peer group represented by peer group node 606a.

Peer group node 606b has the label "PeerGroup" indicating that it is a peer group node. Peer group node 606b is shown as being associated with a set of properties that define the attributes or data of that peer group node 606b, including here that the "id" of peer group node 606b is "pg763", the "size" of peer group node 606b is "146", the "clique" of peer group node 606b is "0.74" and the "mean_sim" or mean similarity value of peer group node 606b is "0.92". Entitlement node 604a and peer group node 606b of the identity graph 600 are joined by an edge formed by directed relationship 614b. Directed relationship 614b may represent that the identity of entitlement node 604a belongs to (represented by the labeled "BELONGS_TO_PG" relationship 614b) the peer group represented by peer group node 606b.

Role nodes 608a, 608b have the label "Role" indicating that they are Role nodes. Role node 608a is shown as being associated with a set of properties that define the attributes or data of that Role node 608a, including here that the "id" of entitlement node 608a is "Role_0187". Role node 608b is shown as being associated with a set of properties that define the attributes or data of that role node 608b, including here that the "id" of role node 608b is "Role_3128". Directed relationship 618 may represent that the identity of identity node 602b has (represented by the labeled "HAS_ROLE" relationship 618) the role represented by role node 608a. Directed relationship 620 may represent that the entitlement of entitlement node 604a is a part of or included in (represented by the labeled "PART_OF" relationship 620) the role represented by role node 608a.

These role nodes 608 of the identity graph 600 are joined by edges formed by directed relationships 612e, 612f. Directed relationship 612e may represent that the role represented by role node 604a is similar to the role represented by role node 604b. Similarly, directed relationship 612f may represent that the role represented by role node 608b is similar to the role represented by role node 608a. Here, relationship 612e has been assigned a similarity weight of 0.64. Again, notice that while these relationships 612e, 612f are depicted as individual directional relationships, such a similar relationship may be a single bidirectional relationship assigned a single similarity weight.

Figure 6B:
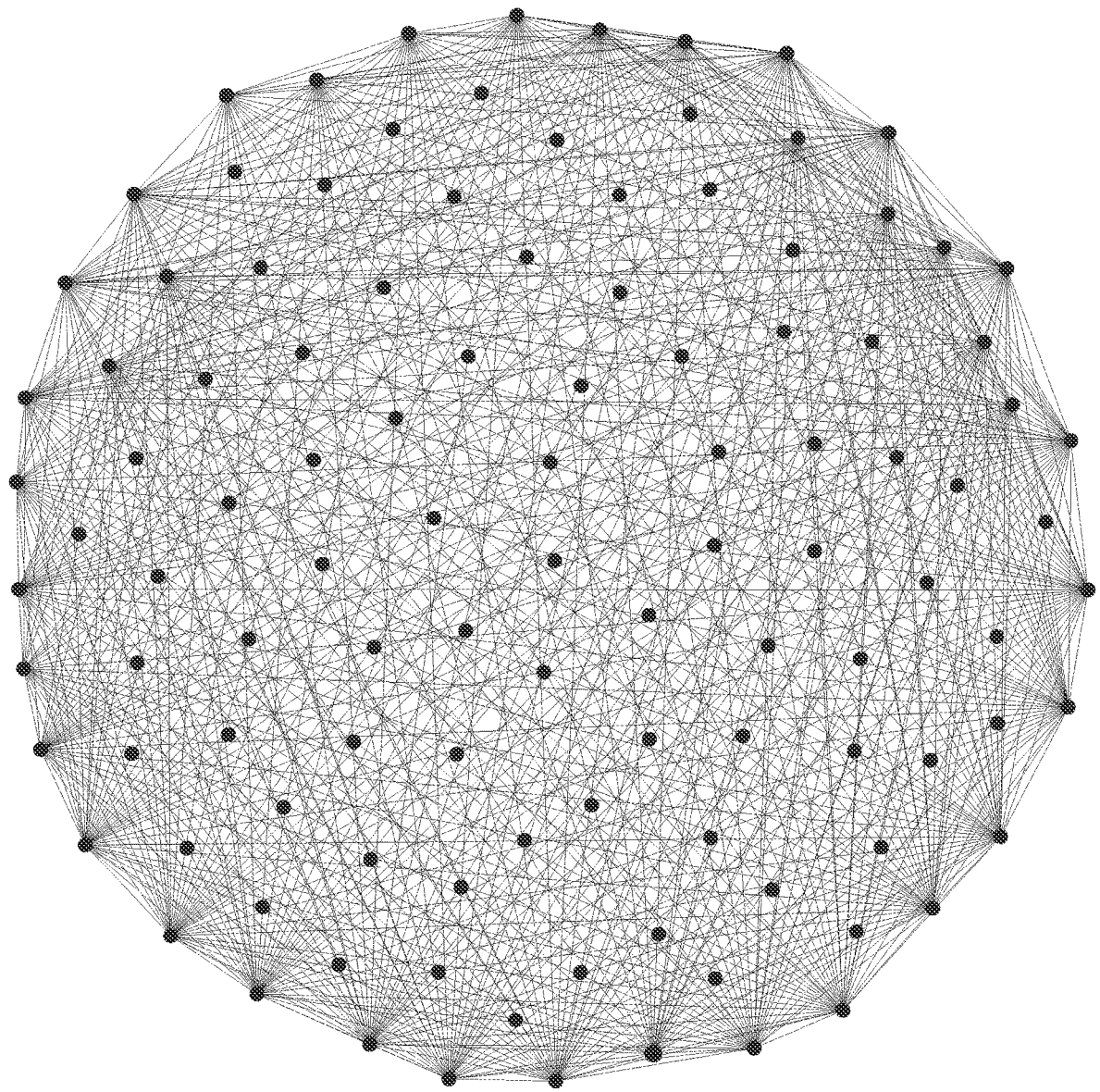
Figure 6C:
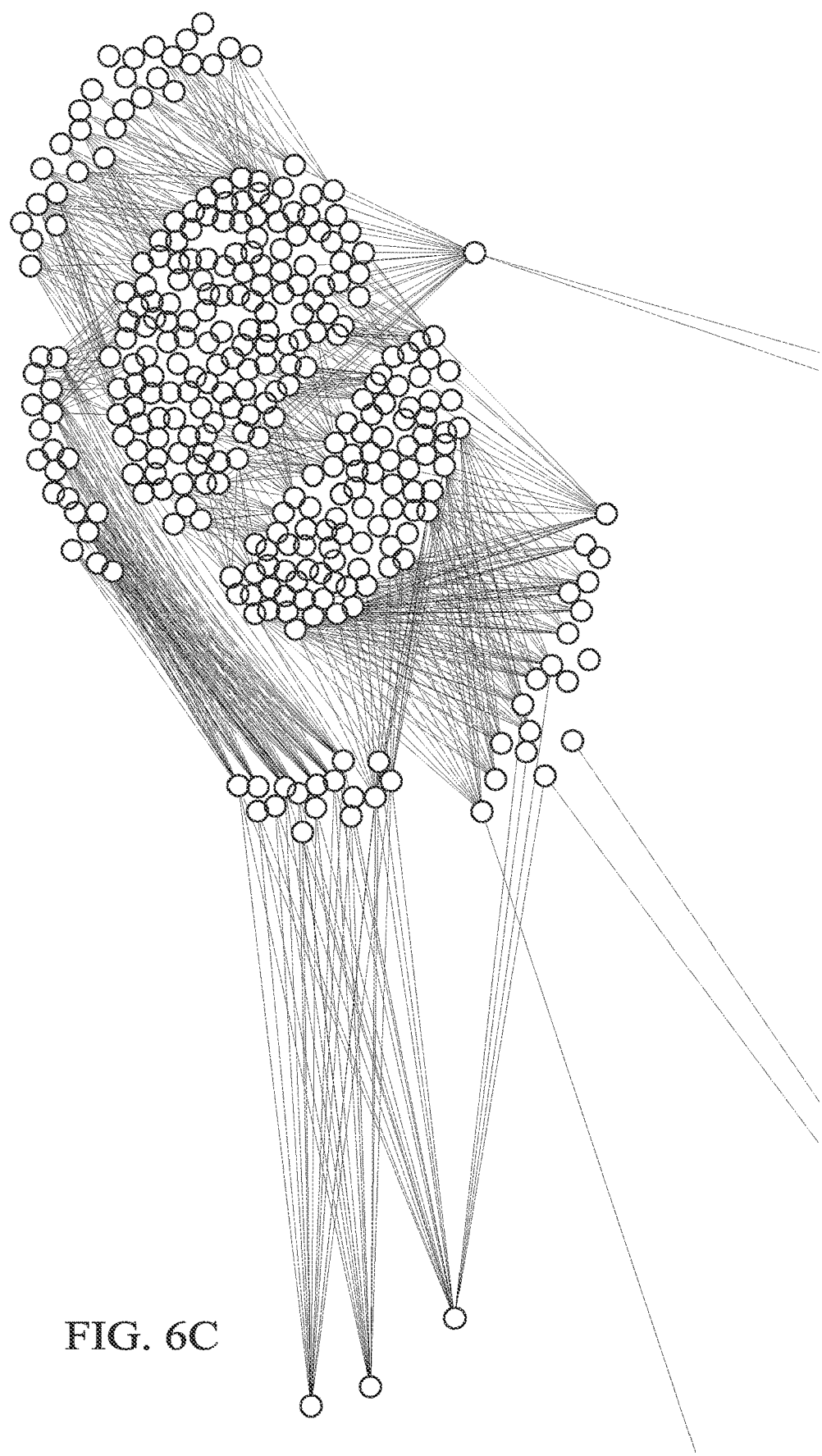
Figure 6D:
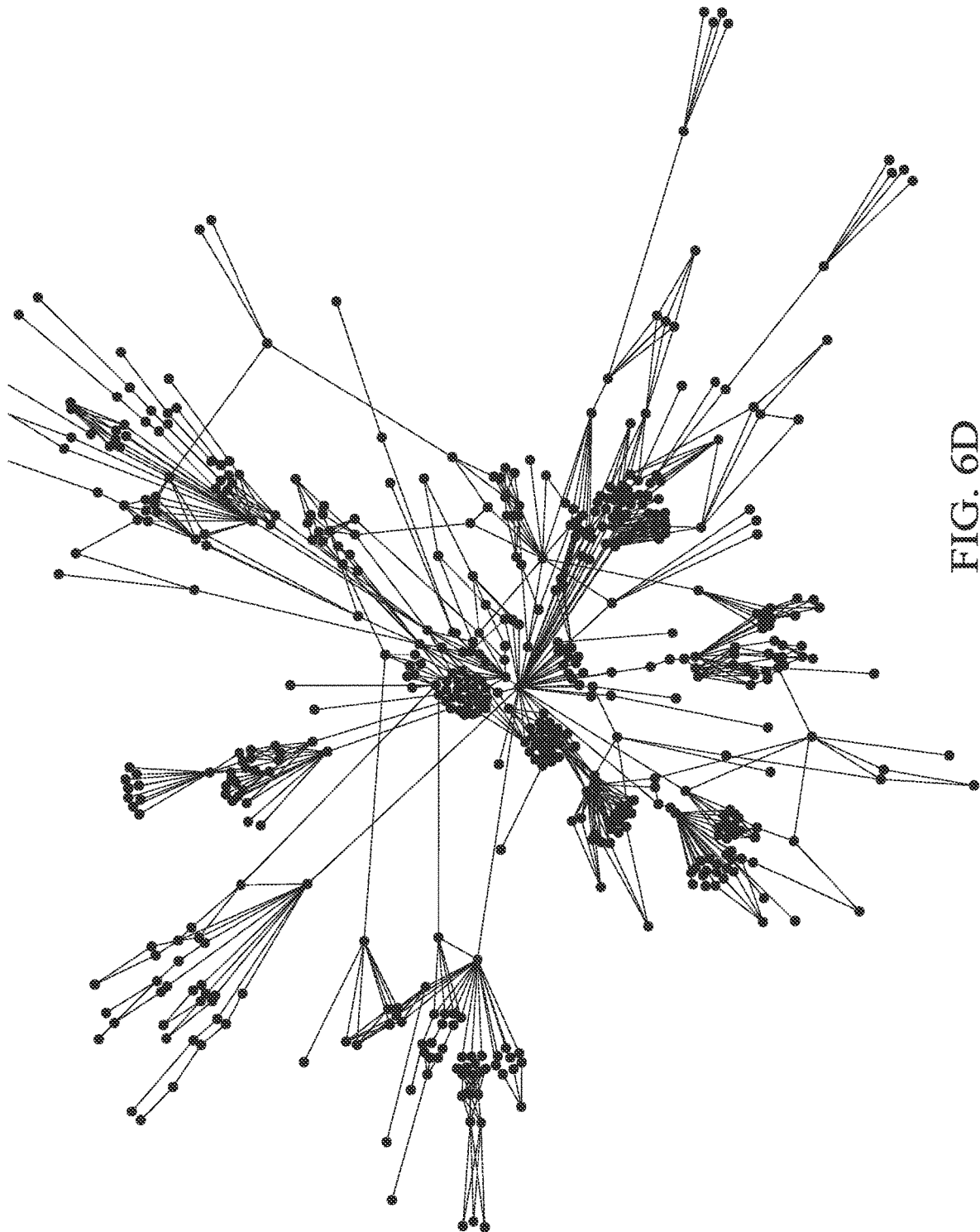

Now referring to FIGS. 6B, 6C and 6D, example representations of peer groupings within identity graphs are depicted. Here, each identity node of an identity graph is represented by a circle and each edge is represented by a line joining the nodes. In these visual depictions, the closer the nodes the higher the similarity value between the nodes. Such visual depictions when presented to a user may allow a user to better perceive the number of identities utilized by an enterprise, the relationships between those identities, the distribution of entitlements with respect to those identities or other information related to the identities or entitlements that may be utilized in identity governance and management, including for example, compliance assessment or auditing. FIG. 6E depicts an example visual representations of an embedding of an identity graph such as those depicted herein.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A method, comprising:
   generating an identify graph by:
      obtaining identity management data from one or more identity management systems in a distributed enterprise computing environment, the identity management data comprising data associated with a set of entitlements and a set of identities utilized with identity management in the distributed enterprise computing environment, wherein each entitlement of the set of entitlements relates to an access right within the distributed enterprise computing environment;
      generating the identity graph from the identity management data by creating a node in the identity graph for each identity and for each entitlement; and
      for each identity that is associated with an entitlement of the set of entitlements, creating an edge in the identity graph representing a relationship between the nodes representing the respective identity and respective entitlement;
   deriving a first dataset from the identity graph at a first time;
   training a first machine learning model used by a machine learning system based on the first dataset;
   responsive to determining that an incremental training time interval has elapsed, deriving a second dataset from the identity graph;
   applying a drift detection model to the second dataset to determine a drift measure between the second dataset and the first dataset; and
   based on the determined drift measure, performing one of:
      continuing to use the first machine learning model in the machine learning system,
      incrementally training the first machine learning model using a third dataset comprised of data including data from the second dataset, or
      training a second machine learning model for use in the machine learning system and replacing the first machine learning model with the second machine learning model.

2. The method of claim 1, wherein the drift prediction model is trained based on the first dataset.

3. The method of claim 1, wherein the first dataset comprises data generated from performing graph embedding on at least a portion of the identity graph at the first time and the second dataset comprises data generated from performing graph embedding on at least a portion of the identity graph at a second time.

4. The method of claim 3, wherein the graph embedding is performed using a graph embedding model.

5. The method of claim 1, further comprising comparing the drift measure to a warning threshold.

6. The method of claim 5, further comprising when the drift measure is greater than the warning threshold, generating an alert to a user indicating that data drift is occurring.

7. The method of claim 1, wherein the second dataset comprises data derived from the identity graph subsequent to a time at which the first dataset is derived.

8. A non-transitory computer readable medium, comprising instructions for:
   generating an identify graph by:
      obtaining identity management data from one or more identity management systems in a distributed enterprise computing environment, the identity management data comprising data associated with a set of entitlements and a set of identities utilized with identity management in the distributed enterprise computing environment, wherein each entitlement of the set of entitlements relates to an access right within the distributed enterprise computing environment;

generating the identity graph from the identity management data by creating a node in the identity graph for each identity and for each entitlement; and for each identity that is associated with an entitlement of the set of entitlements, creating an edge in the identity graph representing a relationship between the nodes representing the respective identity and respective entitlement;

deriving a first dataset from the identity graph at a first time;

training a first machine learning model used by a machine learning system based on the first dataset;

responsive to determining that an incremental training time interval has elapsed, deriving a second dataset from the identity graph;

applying a drift detection model to the second dataset to determine a drift measure between the second dataset and the first dataset; and based on the determined drift measure, performing one of:
continuing to use the first machine learning model in the machine learning system,
incrementally training the first machine learning model using a third dataset comprised of data including data from the second dataset, or
training a second machine learning model for use in the machine learning system and replacing the first machine learning model with the second machine learning model.

9. The non-transitory computer readable medium of claim 8, wherein the drift prediction model is trained based on the first dataset.

10. The non-transitory computer readable medium of claim 8, wherein the first dataset comprises data generated from performing graph embedding on at least a portion of the identity graph at the first time and the second dataset comprises data generated from performing graph embedding on at least a portion of the identity graph at a second time.

11. The non-transitory computer readable medium of claim 10, wherein the graph embedding is performed using a graph embedding model.

12. The non-transitory computer readable medium of claim 8, further comprising comparing the drift measure to a warning threshold.

13. The non-transitory computer readable medium of claim 12, further comprising when the drift measure is greater than the warning threshold, generating an alert to a user indicating that data drift is occurring.

14. An identity management system, comprising:
a data store;
a processor;
a non-transitory, computer-readable storage medium, including computer instructions for:
generating an identify graph by:
obtaining identity management data from one or more identity management systems in a distributed enterprise computing environment, the identity management data comprising data associated with a set of entitlements and a set of identities utilized with identity management in the distributed enterprise computing environment, wherein each entitlement of the set of entitlements relates to an access right within the distributed enterprise computing environment;

generating the identity graph from the identity management data by creating a node in the identity graph for each identity and for each entitlement; and for each identity that is associated with an entitlement of the set of entitlements, creating an edge in the identity graph representing a relationship between the nodes representing the respective identity and respective entitlement;

deriving a first dataset from the identity graph at a first time;

training a first machine learning model used by a machine learning system based on the first dataset;

responsive to determining that an incremental training time interval has elapsed, deriving a second dataset from the identity graph;

applying a drift detection model to the second dataset to determine a drift measure between the second dataset and the first dataset; and based on the determined drift measure, performing one of:
continuing to use the first machine learning model in the machine learning system,
incrementally training the first machine learning model using a third dataset comprised of data including data from the second dataset, or
training a second machine learning model for use in the machine learning system and replacing the first machine learning model with the second machine learning model.

15. The system of claim 14, wherein the drift prediction model is trained based on the first dataset.

16. The system of claim 14, wherein the first dataset comprises data generated from performing graph embedding on at least a portion of the identity graph at the first time and the second dataset comprises data generated from performing graph embedding on at least a portion of the identity graph at a second time.

17. The system of claim 16, wherein the graph embedding is performed using a graph embedding model.

18. The system of claim 14, further comprising comparing the drift measure to a warning threshold.

19. The system of claim 18, further comprising when the drift measure is greater than the warning threshold, generating an alert to a user indicating that data drift is occurring.

20. The system of claim 14, wherein the second dataset comprises data derived from the identity graph subsequent to a time at which the first dataset is derived.

* * * * *